(12) United States Patent
Kurian et al.

(10) Patent No.: US 12,361,323 B2
(45) Date of Patent: Jul. 15, 2025

(54) DYNAMIC INFORMATION REDUCTION USING A VELOCITY BASED MACHINE LEARNING MODEL

(71) Applicant: Bank of America Corporation, Charlotte, NC (US)

(72) Inventors: Manu Kurian, Dallas, TX (US); Albena N. Fairchild, Spruce Pine, NC (US)

(73) Assignee: Bank of America Corporation, Charlotte, NC (US)

( * ) Notice: Subject to any disclaimer, the term of this patent is extended or adjusted under 35 U.S.C. 154(b) by 709 days.

(21) Appl. No.: 17/690,510

(22) Filed: Mar. 9, 2022

(65) Prior Publication Data

US 2023/0289651 A1    Sep. 14, 2023

(51) Int. Cl.
*G06F 17/00* (2019.01)
*G06F 16/23* (2019.01)
*G06F 16/27* (2019.01)
*G06N 20/00* (2019.01)

(52) U.S. Cl.
CPC ......... *G06N 20/00* (2019.01); *G06F 16/2379* (2019.01); *G06F 16/27* (2019.01)

(58) Field of Classification Search
CPC ..... G06N 20/00; G06F 16/2379; G06F 16/27; H04L 9/50; H04L 63/12
See application file for complete search history.

(56) References Cited

U.S. PATENT DOCUMENTS

| | | | |
|---|---|---|---|
| 5,684,959 A | 11/1997 | Bhat et al. | |
| 5,990,862 A | 11/1999 | Lewis | |
| 8,335,912 B2 | 12/2012 | Golla et al. | |
| 9,026,302 B2 | 5/2015 | Stout et al. | |
| 9,104,836 B2 | 8/2015 | Burstein et al. | |
| 9,188,983 B2 | 11/2015 | Stout et al. | |
| 9,473,496 B2 | 10/2016 | Burstein et al. | |
| 9,747,009 B2 | 8/2017 | Jadhav et al. | |
| 9,895,808 B2 | 2/2018 | Stout et al. | |
| 9,967,709 B2 | 5/2018 | Patel et al. | |
| 10,212,042 B2 | 2/2019 | Patel et al. | |

(Continued)

OTHER PUBLICATIONS

Mar. 6, 2024—(US) Notice of Allowance—U.S. Appl. No. 17/683,802.

*Primary Examiner* — Greta L Robinson
(74) *Attorney, Agent, or Firm* — Banner & Witcoff, Ltd.

(57) ABSTRACT

Aspects of the disclosure relate to an information reduction platform. The information reduction platform may generate data silos within a distributed ledger system. The information reduction platform may receive a data use case request from a client device corresponding to a first user. The information reduction platform may identify relevant data silos corresponding to the data use case request. The information reduction platform may direct the distributed ledger system to grant the client device access to the relevant data silos. The information reduction platform may monitor the efficiency of the relevant data silos. The information reduction platform may generate data velocity values (DVVs) for each relevant data silo. The information reduction platform may train a machine learning model to select a subset of relevant data silos for a particular data use case. The information reduction platform may create an iterative feedback loop to update the first machine learning model.

20 Claims, 16 Drawing Sheets

(56) References Cited

U.S. PATENT DOCUMENTS

| | | | |
|---|---|---|---|
| 10,296,219 B2 | 5/2019 | Wang et al. | |
| 10,409,511 B1 | 9/2019 | Subbarao et al. | |
| 10,466,511 B2 | 11/2019 | Wen et al. | |
| 10,466,929 B2 | 11/2019 | Byun | |
| 10,583,562 B2 | 3/2020 | Stout et al. | |
| 10,972,402 B1 | 4/2021 | Akash | |
| 11,052,540 B2 | 7/2021 | Stout et al. | |
| 11,164,115 B1* | 11/2021 | Todd | H04L 9/3239 |
| 11,226,760 B2 | 1/2022 | Wang et al. | |
| 12,051,073 B2* | 7/2024 | Gupta | H04L 9/3247 |
| 2014/0156847 A1* | 6/2014 | Moscibroda | H04L 41/0893 |
| | | | 709/226 |
| 2018/0232532 A1 | 8/2018 | Kurian et al. | |
| 2022/0363302 A1* | 11/2022 | Wu | B62B 9/104 |
| 2022/0398264 A1* | 12/2022 | Eloul | G06N 3/04 |
| 2024/0045848 A1 | 2/2024 | Subramanian Seshadri et al. | |

* cited by examiner

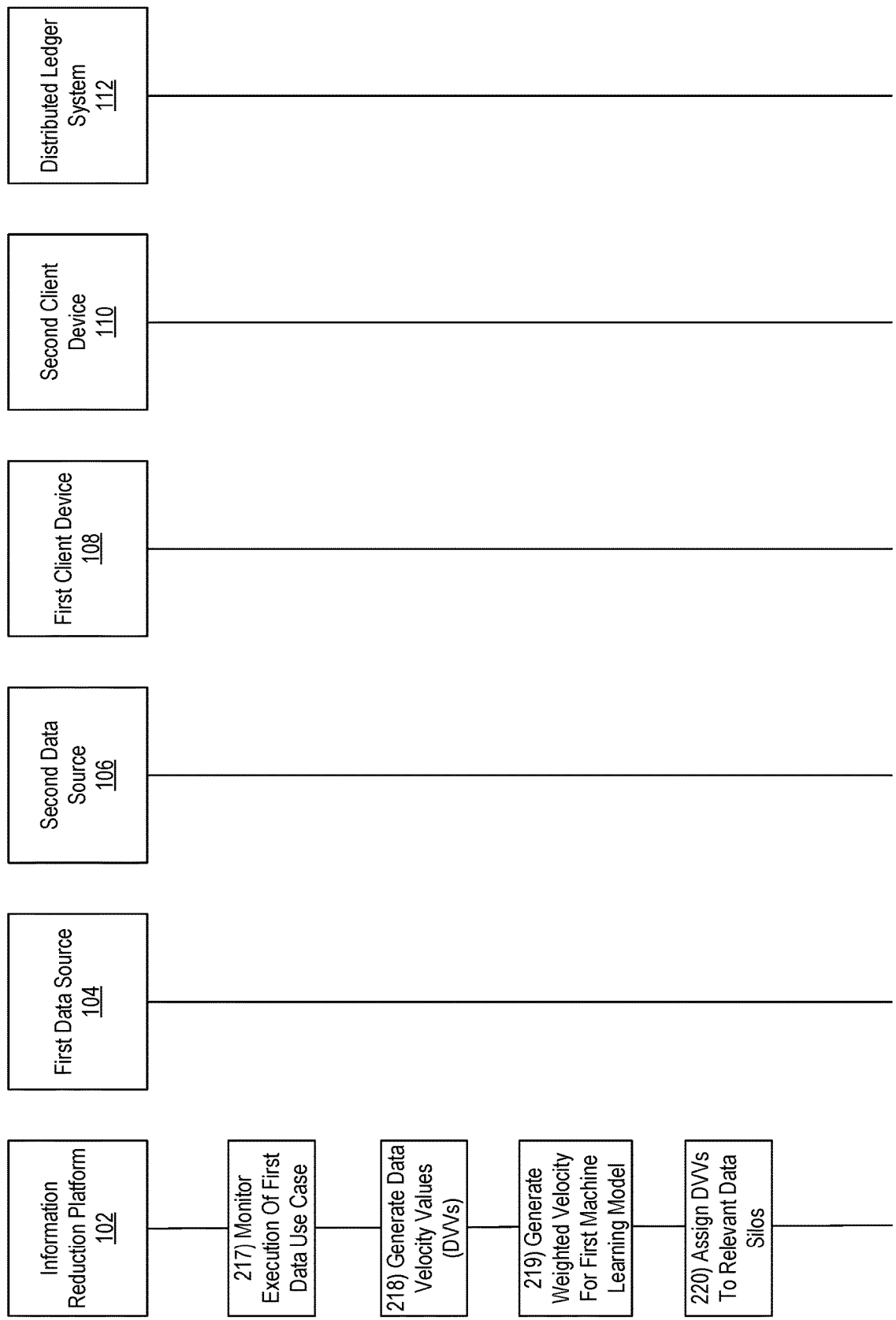

300

Data Silo Information Interface
Welcome, <Client Device Profile>

Data Use Case 1: . . . Mortgage Comparison

Suggested Data Silo DVVs:
Mortgage Rates County 1 = 70.00
Mortgage Rates County 2 = 75.00
Mortgage Rates State 1 = 45.00

Suggested Data Silo Sources:
Mortgage Rates County 1 = Internal
Mortgage Rates County 2 = Internal
Mortgage Rates State 1 = External

FIG. 3A

DYNAMIC INFORMATION REDUCTION USING A VELOCITY BASED MACHINE LEARNING MODEL

BACKGROUND

Aspects of the disclosure relate to dynamic information reduction using a velocity based machine learning model. In some instances, one individual or multiple individuals may wish to process or otherwise make use of information they have access to in order to complete some task or tasks. In some cases, however, the individual or individuals may have access to a significant amount of information. In some instances, multiple subsets of information (e.g., data) may be capable of completing the task or tasks. It may be difficult to determine which subsets of information are optimally suited to use in completing the task or tasks. In some cases, this may negatively impact the user experience and may result in inefficient information allocation.

SUMMARY

Aspects of the disclosure provide effective, efficient, scalable, and convenient technical solutions that address and overcome the technical problems associated with information allocation. In accordance with one or more embodiments of the disclosure, a computing platform with at least one processor, a communication interface, and memory storing computer-readable instructions may generate data silos within a distributed ledger system, where the data silos may correspond to individual data use cases. The computing platform may receive a first data use case request from a first client device, where the first client device may correspond to a first user. The computing platform may identify relevant data silos corresponding to the first data use case request based on the first data use case request. The computing platform may direct the distributed ledger system to grant the first client device access to the relevant data silos. The computing platform may monitor the distributed ledger system and the first client device to identify the efficiency of the relevant data silos in satisfying the first data use case request. The computing platform may also generate a data velocity value (DVV) for each relevant data silo based on the efficiency of each relevant data silo, where each DVV may indicate a rate of change of data stored in the corresponding relevant data silo. The computing platform may train a first machine learning model based on the DVVs to select a subset of relevant data silos for a particular use case. The subset of relevant data silos for the particular data use case may comprise more efficient data for the particular data use case than the remaining data of the relevant data silos. The computing platform may also receive a second data use case request via a second client device, where the second client device may correspond to a second user. The computing platform may input the second data use case request into the first machine learning model, where the first machine learning model may then identify a subset of relevant data silos for the second data use case request. The computing platform may monitor the performance of the subset of relevant data silos for the second data use case request. The computing platform may also update the DVVs based on the performance of the subset of relevant data silos. The computing platform may send the updated DVVs and one or more commands directing the distributed ledger system to modify a stored distributed ledger to include the updated DVVs to the distributed ledger system. The distributed ledger system may modify the stored distributed ledger to include the updated DVVs. The computing platform may also input the updated DVVs into the first machine learning model to refine the first machine learning model.

In one or more instances, the computing platform may send one or more commands directing the first client device to display information corresponding to the relevant data silos. The one or more commands directing the first client device to display the information corresponding to the relevant data silos may cause the first client device to display the information corresponding to the relevant data silos.

In one or more examples, the information corresponding to the relevant data silos may be one or more of the physical sources of the data in the relevant data silos, the commercial owners of the data in the relevant data silos, the digital sources of the data in the relevant data silos, the memory space of the data in the relevant data silos, the DVVs of the relevant data silos, or authenticating information corresponding to the data in the relevant data silos.

In one or more instances, the computing platform may receive one or more commands from the first client device directing the first machine learning model to assign one or more specific DVVs to one or more specific relevant data silos. Additionally or alternatively, the computing platform may receive one or more commands from the first client device directing the first machine learning model to select a particular subset of relevant data silos for a particular data use case. Additionally or alternatively, the computing platform may update the DVVs for one or more specific relevant data silos based on the one or more commands received from the first user device.

In one or more examples, the computing platform may generate a weighted velocity score corresponding to the first machine learning model based on the efficiency of the subset of relevant data silos. Additionally or alternatively, the computing platform may send the weighted velocity score corresponding to the first machine learning model to the distributed ledger system.

In one or more instances, the computing platform may generate a second machine learning model based on the weighted velocity score.

In one or more instances, the computing platform may input the second data use case request into one or more additional machine learning models in order to identify the subset of relevant data silos. In one or more examples, each of the one or more additional machine learning models may have a weighted velocity score. Additionally or alternatively, the computing platform may compare the weighted velocity scores to identify the subset of relevant data silos. In one or more examples, the computing platform may identify a core machine learning model for the particular use case.

In one or more instances, the computing platform may receive a second machine learning model from a data source. The second machine learning model may include DVVs for the relevant data silos for particular use cases. Additionally or alternatively, the computing platform may refine the first machine learning model based on the second machine learning model. In one or more examples, the computing platform may refine the first machine learning model by integrating the relevant data silos and corresponding DVVs from the second machine learning model into the first machine learning model. In one or more examples, the computing platform may refine the first machine learning model by replacing relevant data silos corresponding to the first machine learning model with select relevant data silos from the second machine learning model. Replacing the relevant data silos corresponding to the first machine learning model may be based on the DVVs for the select relevant data silos from the second machine learning model.

In one or more instances, the computing platform may generate new data silos within the distributed ledger system based on data received from a data source. In some examples, the computing platform may identify the efficiency of the relevant data silos based on identifying one or more of the memory usage, the total processor utilization, the packet loss, and the data upload and download speeds corresponding to the relevant data silos.

In one or more instances, the computing platform may generate additional DVVs to update the DVVs. Each additional DVV may indicate a rate of change of data corresponding to a particular variable.

In one or more examples, the computing platform may track changes in the DVVs for relevant data silos over a period of time. The period of time may be automated or manually selected by a user. Additionally or alternatively, the computing platform may assign a growth score for each of the relevant data silos. The growth score may be based on the changes in the DVVs over time. Additionally or alternatively, each growth score may indicate a rate of increase in the DVV over time. In one or more examples, the computing platform may further send the growth scores and one or more commands to the distributed ledger system directing the distributed ledger system to modify a stored distributed ledger to include the growth scores. The one or more commands directing the distributed ledger system to modify the stored distributed ledger to include the growth scores may cause the distributed ledger system to modify the stored distributed ledger to include the growth scores. Additionally or alternatively, the computing platform may input the growth scores into the first machine learning model to refine the first machine learning model.

In one or more instances, the relevant data silos may include subsets of data. The subsets of data may include both constant values and variable values.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for dynamically maximizing data use efficiency and reducing data use requirements using a machine learning model in accordance with one or more example embodiments;

FIGS. 3A-3C depict illustrative graphical user interfaces depicting dynamic data information reduction using a machine learning model in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for maximizing data use efficiency and reducing data use requirements. Users of a set of data (that may, e.g., be managed by an enterprise organization such as a financial institution) may have access to a substantial amount of data (that may, e.g., be stored in a distributed ledger of a distributed ledger system) that may be relevant to a particular data use case they wish to execute. Isolating which subsets of the total data available are most relevant to the particular data use case at issue may be difficult, and some subsets of data may be more efficient than others for the users to access when executing a particular data use case. Accordingly, systems may monitor the execution of data use cases and assign relative scores (e.g., data velocity values) to the relevant subsets of data (which may, e.g., be referred to as data silos) based on said subsets' efficiency. These scores may be used in the future to determine optimal subsets of the relevant data to use for a particular use case. For example, a user may seek to run an efficiency play on a set of data relating to prices for a commercial transaction in a region. In some examples, one or more subsets of relevant data may be capable of performing this particular data use case. The system may make use of a machine learning model to identify and recommend which subsets of relevant data will most efficiently execute the data use case. The system may then continue to train the first machine learning model based on the efficiency of the suggested subsets of relevant data. In some instances, the system may score the first machine learning model itself.

In some instances, similar systems may be employed by multiple users concurrently. In some examples, data from one user employing a system may be acquired by another user employing a similar system. The systems may share their machine learning models to further train the models in identifying and recommending which subsets of relevant data will most efficiently execute a particular data use case.

Figure 1A:
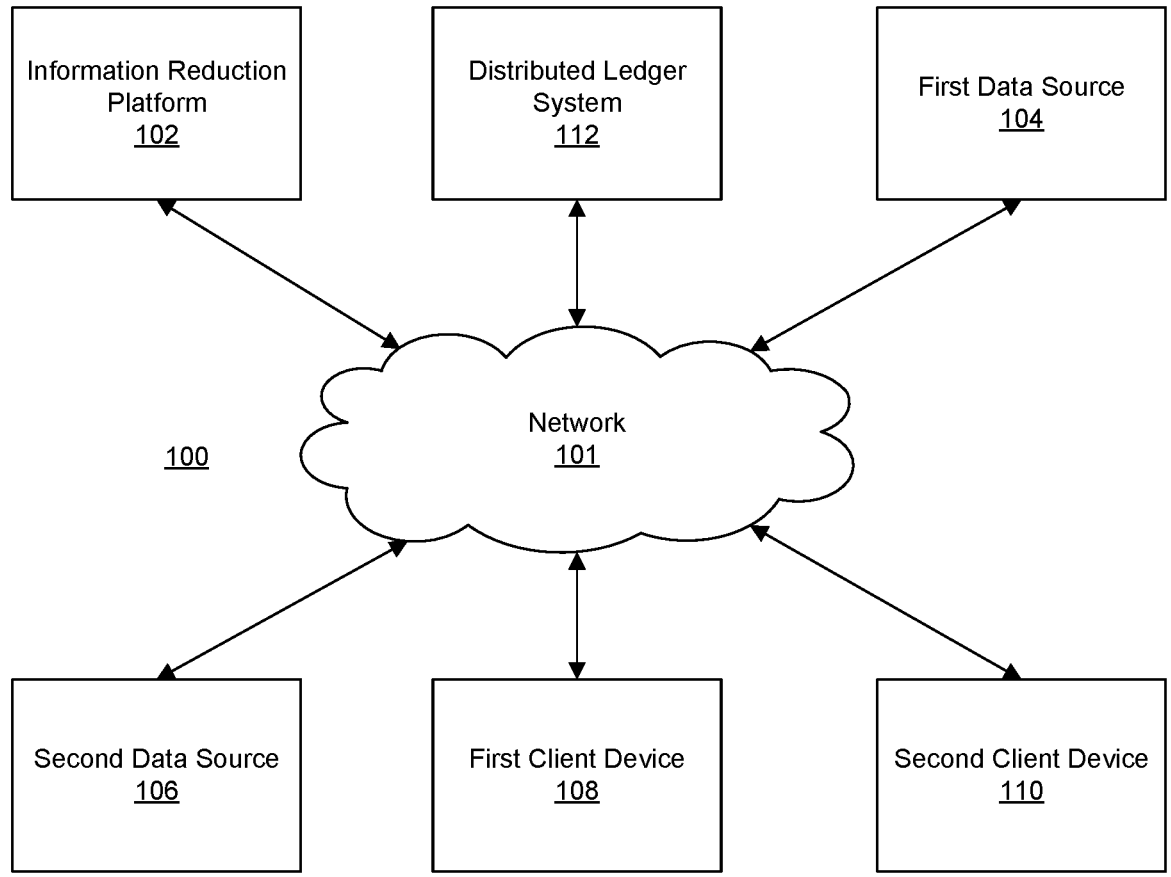
FIGS. 1A-1B depict an illustrative computing environment for maximizing data use efficiency and reducing data use requirements using a machine learning model in accordance with one or more example embodiments.
Figure 1B:
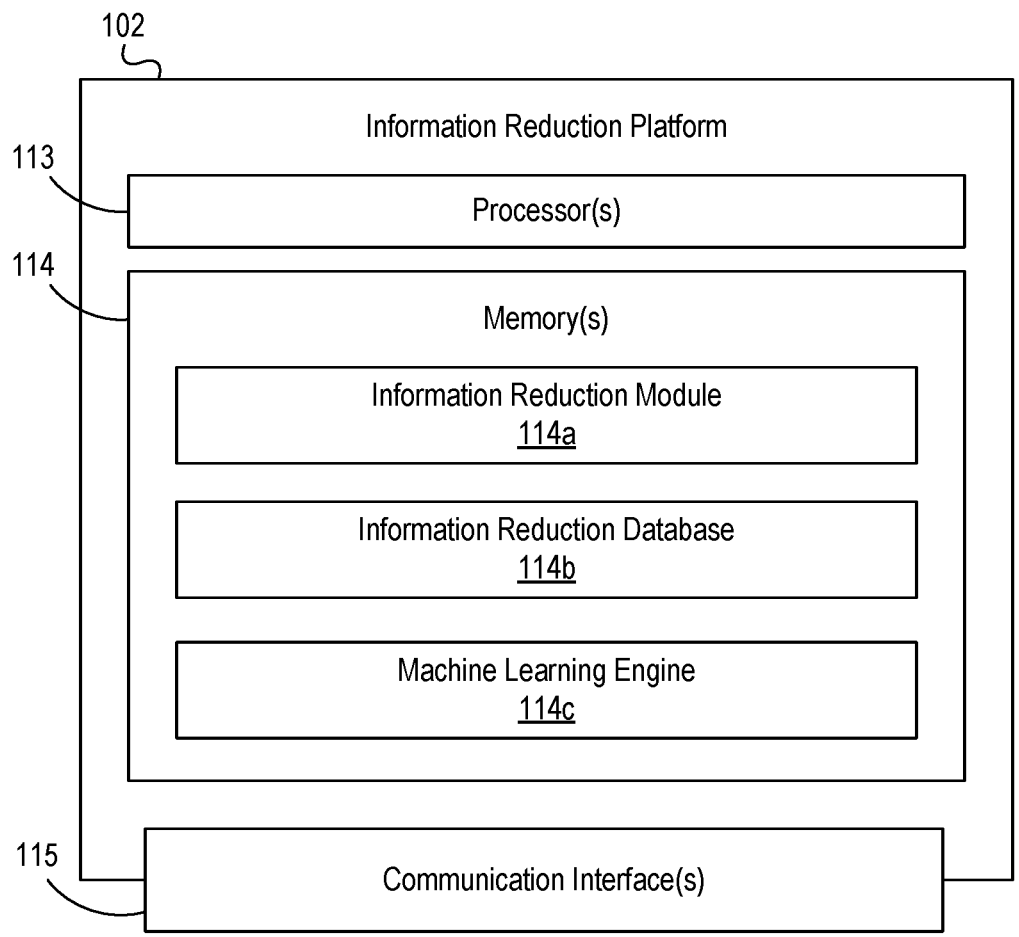

FIGS. 1A-1B depict an illustrative computing environment for dynamically reducing information using a machine learning model in accordance with one or more example embodiments. Referring to FIG. 1A, computing environment 100 may include one or more computer systems. For example, computing environment 100 may include an information reduction platform 102, a first data source 104, a second data source 106, a first client device 108, a second client device 110, and a distributed ledger system 112.

As described further below, information reduction platform 102 may be a computer system that includes one or more computing devices (e.g., servers, server blades, or the like) and/or other computer components (e.g., processors, memories, communication interfaces) that may be used to configure and train one or more machine learning models. For example, the information reduction platform 102 may train the one or more machine learning models to select data silos to perform a particular data use case request. In some instances, information reduction platform 102 may be controlled or otherwise maintained by an enterprise organization such as a financial institution.

First data source 104 may be a data storing device (e.g., laptop computer, desktop computer, mobile device, tablet, smartphone, server, server blade, and/or other device) and/or other data storing component (e.g., processors, memories, communication interfaces, databases) that may be used to transfer data between users and/or perform other user functions (e.g., providing data for a data use case, storing data, and/or other functions). In one or more instances, first data source 104 may correspond to a first user (who may, e.g., be an employee or client of the enterprise organization such as a financial institution). In one or more instances, the first data source 104 may be configured to communicate with one or more systems (e.g., distributed ledger system 112 and/or other systems) to transfer data and/or to perform other functions.

Second data source 106 may be a data storing device (e.g., laptop computer, desktop computer, mobile device, tablet, smartphone, server, server blade, and/or other device) and/or other data storing component (e.g., processors, memories, communication interfaces, databases) similar to first data source 104 that may be used to transfer data between users and/or other user functions (e.g., providing data for a data use case, storing data, and/or performing other functions). In one or more instances, first data source 104 may correspond to a second user (who may, e.g., be an employee or client of an enterprise organization such as a financial institution). In one or more instances, the second user may be different from the first user. In one or more instances, the second data source 106 may be configured to communicate with one or more systems (e.g., distributed ledger system 112 and/or other systems) to transfer data and/or to perform other functions.

First client device 108 may be a computing device (e.g., laptop computer, desktop computer, mobile device, tablet, smartphone, or other computing device) and/or other computer components (e.g., processors, memories, communication interfaces) that may be used to perform data use cases and/or provide user functions (e.g., data reduction or other functions). In one or more instances, the first client device 108 may correspond to a first user (who may, e.g., be an employee or client of an enterprise organization such as a financial institution). In one or more instances, first client device 108 may be configured to communicate with information reduction platform 102 for machine learning model configuration/training, data reduction execution, data use case request monitoring, and/or to perform other functions. In some instances, the first client device 108 may be configured to display one or more graphical user interfaces (e.g., data reduction interfaces, data scoring interfaces, data information interfaces, and/or other interfaces).

Second client device 110 may be a computing device (e.g., laptop computer, desktop computer, mobile device, tablet, smartphone, or other computing device) and/or other computer components (e.g., processors, memories, communication interfaces) similar to first client device 108 that may be used to perform data use cases and/or provide user functions (e.g., data reduction or other functions). The second client device 110 may be a same device as the first client device 108 or a separate, different device. In one or more instances, the second client device 110 may correspond to a second user (who may, e.g., be an employee or client of an enterprise organization such as a financial institution). In one or more instances, the second user may be different from the first user. In one or more instances, second client device 110 may be configured to communicate with information reduction platform 102 for machine learning model configuration/training, data reduction execution, data use case request monitoring, and/or to perform other functions. In some instances, the second client device 110 may be configured to display one or more graphical user interfaces (e.g., data reduction interfaces, data scoring interfaces, data information interfaces, and/or other interfaces).

Distributed ledger system 112 may be and/or otherwise include one or more computing devices (e.g., servers, server blades, and/or other devices) and/or other computer components (e.g., processors, memories, communication interfaces) that may be used to create, host, modify, and/or otherwise validate a distributed ledger. The distributed ledger system 112 may be synchronized across multiple nodes (e.g., sites, institutions, geographical locations, and/or other nodes) and may be accessible by multiple users (who may, e.g., be employees or clients of an enterprise organization such as a financial institutions). The data stored in the databases of distributed ledger system 112 may include any of the data (e.g., commercial transaction records, and/or other data) stored in and/or created by first client device 108, second client device 110, and/or any additional data. In some instances, the databases stored on distributed ledger system 112 may be accessed by, validated by, and/or modified by any of, first client device 108, information reduction platform 102, and second client device 110.

Computing environment 100 also may include one or more networks, which may interconnect information reduction platform 102, first data source 104, second data source 106, first client device 108, second client device 110, and distributed ledger system 112. For example, computing environment 100 may include a network 101 (which may interconnect, e.g., information reduction platform 102, first data source 104, second data source 106, first client device 108, second client device 110, and distributed ledger system 112).

In one or more arrangements, information reduction platform 102, first data source 104, second data source 106, first client device 108, second client device 110, and distributed ledger system 112 may be any type of computing device capable of sending and/or receiving requests and processing the requests accordingly. For example, information reduction platform 102, first data source 104, second data source 106, first client device 108, second client device 110, and distributed ledger system 112, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of information reduction platform 102, first data source 104, second data source 106, first client device 108, second client device 110, and/or distributed ledger system 112, may, in some instances, be special-purpose computing devices configured to perform specific functions.

Referring to FIG. 1B, information reduction platform 102 may include one or more processors 113, memory 114, and communication interface 115. A data bus may interconnect processor 113, memory 114, and communication interface 115. Communication interface 115 may be a network interface configured to support communication between information reduction platform 102 and one or more networks (e.g., network 101, or the like). Communication interface 115 may be communicatively coupled to the processor 113. Memory 114 may include one or more program modules having instructions that when executed by processor 113 cause information reduction platform 102 to perform one or more functions described herein and/or one or more databases that may store and/or otherwise maintain information which may be used by such program modules and/or processor 113. In some instances, the one or more program modules and/or databases may be stored by and/or maintained in different memory units of information reduction platform 102 and/or by different computing devices that may form and/or otherwise make up information reduction platform 102. For example, memory 114 may have, host, store, and/or include information reduction module 114a, information reduction database 114b, and machine learning engine 114c.

Information reduction module 114a may have instructions that direct and/or cause information reduction platform 102 to dynamically maximize data use efficiency and reduce data use requirements using a machine learning model. Information reduction database 114b may have instructions causing information reduction platform 102 to store data velocity information (that may, e.g., be used to dynamically reduce data using a machine learning model). Machine learning engine 114c may contain instructions causing information reduction platform 102 to train and/or implement a machine learning model (that may, e.g., be used to dynamically reduce data). In some instances, machine learning engine 114c may be used by information reduction platform 102 and/or information reduction module 114a to refine and/or otherwise update methods for data reduction, and/or other methods described herein.

Figure 2A:
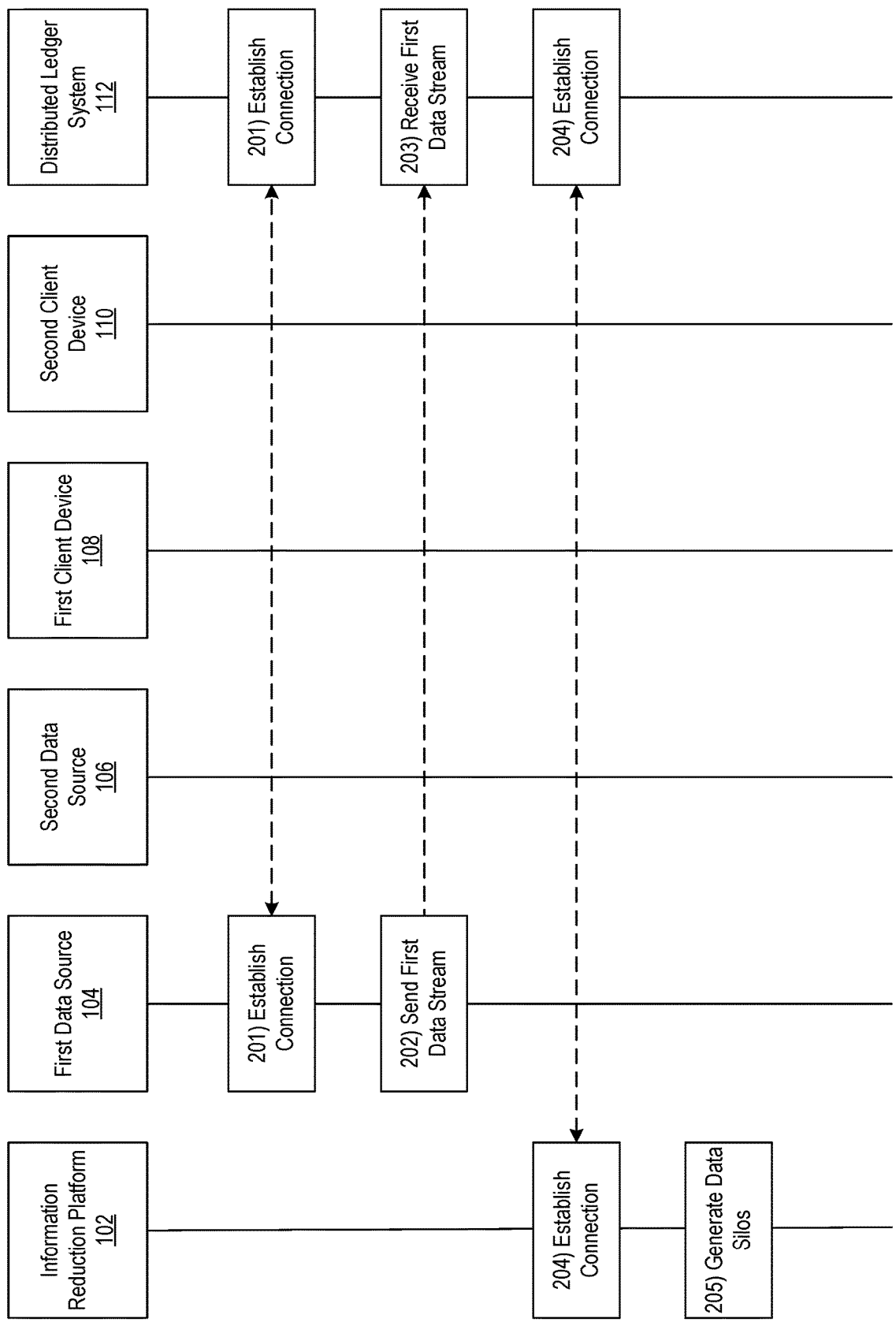

FIGS. 2A-2I depict an illustrative event sequence for dynamically reducing information using a machine learning model in accordance with one or more example embodiments. Referring to FIG. 2A, at step 201, distributed ledger system 112 may establish a connection with first data source 104. For example, distributed ledger system 112 may establish a first wireless data connection with the first data source 104 to link the first data source 104 with the distributed ledger system 112 (e.g., in preparation for sending a first data stream). In some instances, the distributed ledger system 112 may identify whether or not a connection is already established with the first data source 104. If a connection is already established with the first data source 104, the distributed ledger system 112 might not re-establish the connection. If a connection is not yet established with the first data source 104, the distributed ledger system 112 may establish the first wireless data connection as described above.

At step 202, once a connection has been established, the first data source 104 may send a first data stream to the distributed ledger system 112. For example, the first data source 104 may send the first data stream while the first wireless data connection is established.

In some instances, in sending the first data stream, the first data source 104 may send new sets of data, relevant data silos for particular use cases, DVV assignments for relevant data silos, machine learning model data (e.g., one or more additional machine learning models, weighted velocity scores corresponding to one or more machine learning models, and/or other data corresponding to one or more machine learning models), and/or other data. In some instances, in sending the new sets of data, the first data source 104 may send mortgage rates, commercial transactions, demographic data, client information, and/or other data. In some instances, the first data source 104 may have received the new sets of data from the first user, an employee/client of an enterprise organization (e.g., a financial institution), and/or other sources.

At step 203, distributed ledger system 112 may receive the first data stream from the first data source 104. For example, the distributed ledger system 112 may receive the first data stream while the first wireless data connection is established. In some instances, the distributed ledger system 112 may store the first data stream in the distributed ledger. In some instances, the distributed ledger system 112 may store the first data stream to a distributed ledger such as a blockchain, holo-chain, merkle tree, and/or other distributed ledger hosted by the distributed ledger system 112. For example, the distributed ledger system 112 may create a new block or node of the distributed ledger (e.g., modify the distributed ledger), and may store the first data stream in the new block accordingly.

At step 204, distributed ledger system 112 may establish a connection with information reduction platform 102. For example, distributed ledger system 112 may establish a second wireless data connection with the information reduction platform 102 to link the information reduction platform 102 with the distributed ledger system 112 (e.g., in preparation for generating silos of data). In some instances, the distributed ledger system 112 may identify whether or not a connection is already established with the information reduction platform 102. If a connection is already established with the information reduction platform 102, the distributed ledger system 112 might not re-establish the connection. If a connection is not yet established with the information reduction platform 102, the distributed ledger system 112 may establish the second wireless data connection as described above.

At step 205, once a connection has been established, the information reduction platform 102 may generate data silos using the data within the distributed ledger system 112 via the second wireless data connection. In some instances, in generating the data silos, the information reduction platform 102 may generate sets of similar data (e.g., housing prices and mortgage rates in an area, account balances and interest rates at a particular financial institution, and/or other sets of similar data). Additionally or alternatively, in generating the data silos, the information reduction platform 102 may generate sets of data used for a similar data use case (e.g., serving as variables in a particular equation, showing rates of change of data over time, and/or other use cases). In some instances, the information reduction platform 102 may generate the data silos within the distributed ledger system 112. In these instances, the distributed ledger system 112 may store records of these data silos in the distributed ledger.

Figure 2B:
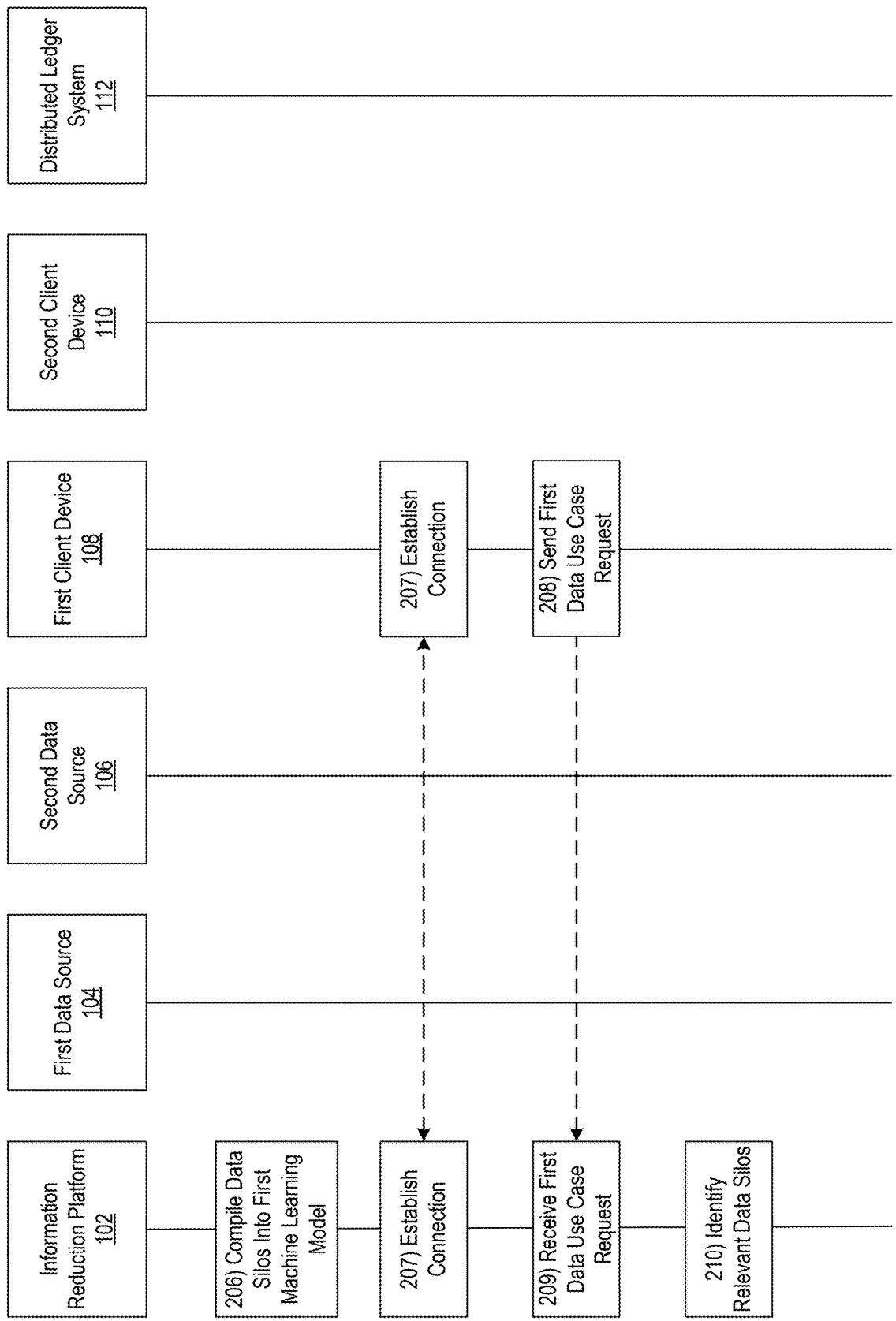

Referring to FIG. 2B, at step 206, the information reduction platform 102 may compile the data silos into a machine learning model. In some instances, the information reduction platform 102 may configure and/or otherwise train the first machine learning model based on the data received by the distributed ledger system 112 at step 203. In some instances, to configure and/or otherwise train the first machine learning model, information reduction platform 102 may process all (or a subset) of the data received by the distributed ledger system 112 at step 203 by applying natural language processing, natural language understanding, and/or other processing techniques/algorithms to generate and store one or more classification models.

For example, in configuring and/or otherwise training the first machine learning model, information reduction platform 102 may apply natural language processing to the first data stream to identify keywords in the new data sets to group the new data sets based on those identified keywords. For instance, the information reduction platform 102 may identify that all new data sets including similar data (e.g., housing prices and mortgage rates in an area, account balances and interest rates at a particular financial institution, and/or other sets of similar data) should be grouped together. Additionally or alternatively, the information reduction platform 102 may mine the first data source 104 to determine common data use cases for the relevant data silos (e.g., serving as variables in a particular equation, showing rates of change of data over time, and/or other use cases) and may group the new data sets into data silos based on those common data use cases. For example, based on the first data stream received at step 203, the information reduction platform 102 may identify that all new data sets corresponding to a data use case of showing mortgage rates in a region over time should be grouped together in a particular data silo.

At step 207, first client device 108 may establish a connection with information reduction platform 102. For example, first client device 108 may establish a third wireless data connection with the information reduction platform 102 to link the information reduction platform 102 with the first client device 108 (e.g., in preparation for sending a first data use case request). In some instances, the first client device 108 may identify whether or not a connection is already established with the information reduction platform 102. If a connection is already established with the information reduction platform 102, the first client device 108 might not re-establish the connection. If a connection is not yet established with the information reduction platform 102, the first client device 108 may establish the third wireless data connection as described above.

At step 208, once a connection has been established, the first client device 108 may send a first data use case request to the information reduction platform 102. For example, the first client device 108 may send the first data use case request via the communication interface 115 and while the third wireless data connection is established. In some instances, in sending the first data use case request, the first client device 108 may send a request to use some subset of the data stored in the distributed ledger system 112 to execute a particular data use case. For example, the first client device 108 may send a request to use data pertaining to housing costs to calculate inflation, to use data pertaining to a financial account to track its growth over time, and/or to perform other functions.

At step 209, information reduction platform 102 may receive the first data use case request from the first client device 108. For example, the information reduction platform 102 may receive the first data use case request via the communication interface 115 and while the third wireless data connection is established. In some instances, the information reduction platform 102 may store the first data use case request in internal memory of information reduction platform 102, and/or external memory.

At step 210, the information reduction platform 102 may identify one or more relevant data silos corresponding to the first data use case request. In some instances, to identify the one or more relevant data silos the information reduction platform may first identify the purpose of the first data use request. For example, the information reduction platform 102 may identify that the purpose of the first data use case request is to calculate inflation in the housing market. In some examples, to identify the one or more relevant data silos the information reduction platform 102 may apply natural language processing to the first data use case request to identify keywords pertaining to the purpose of the first data use case request (e.g., housing, price, and/or other words). The information reduction platform 102 may apply natural language processing to the data silos to identify which data silos include data relevant to the purpose of the first data use case request. In some instances, the one or more relevant data silos corresponding to the first data use case request may be stored in internal memory of information reduction platform 102, and/or external memory.

Figure 2C:
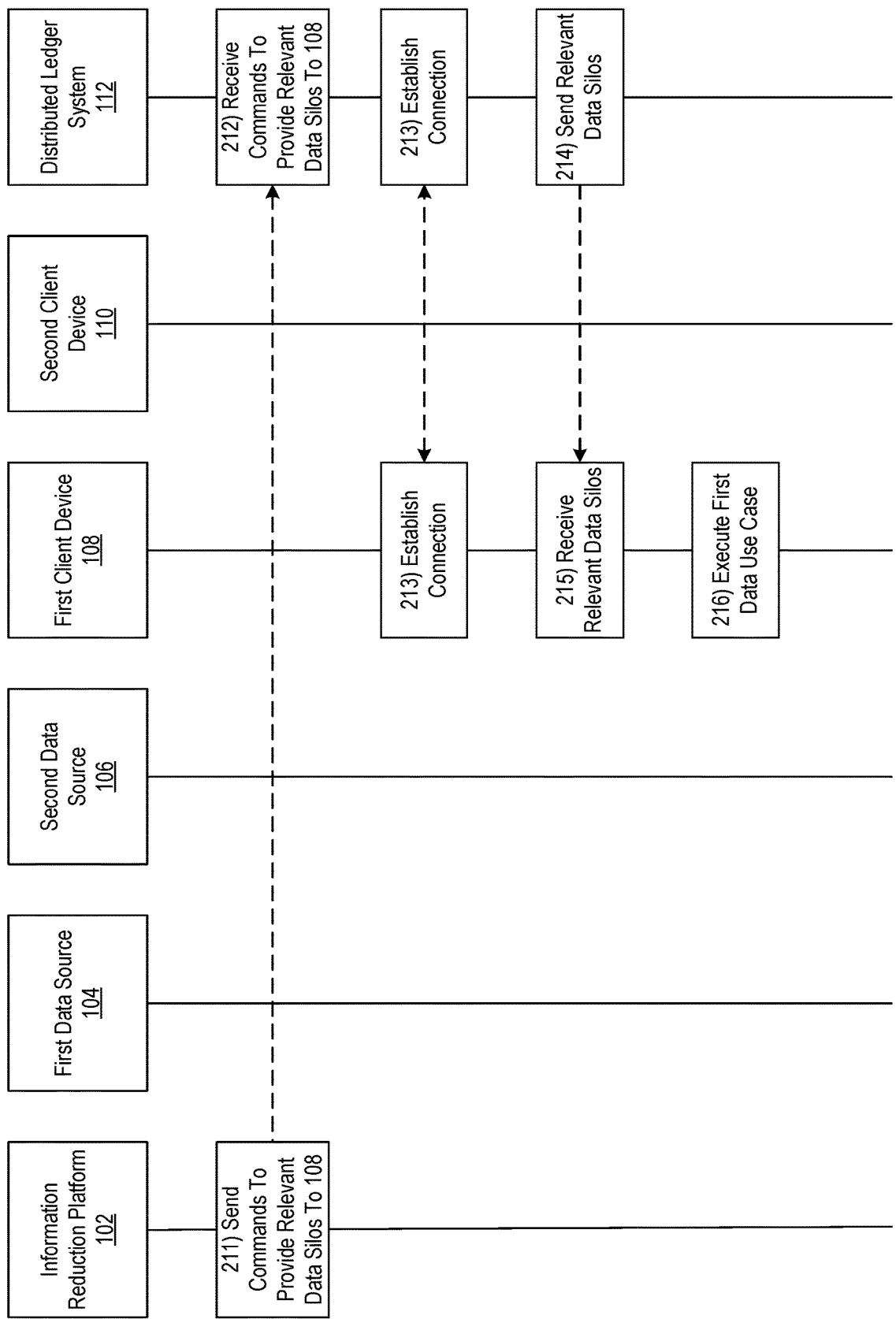

Referring to FIG. 2C, at step 211, the information reduction platform 102 may send one or more commands instructing the distributed ledger system 112 to provide the first client device 108 with access to the one or more relevant data silos. For example, the information reduction platform 102 may send the one or more commands to the distributed ledger system 112 via the communication interface 115 and while the second connection is established. In some instances, the information reduction platform 102 may additionally send one or more commands directing the first client device 108 to display information corresponding to the relevant data silos to the first user (which may, e.g., cause the first client device 108 to display information corresponding to the relevant data silos).

At step 212, distributed ledger system 112 may receive the one or more commands instructing the distributed ledger system 112 to provide the first client device 108 with access to the one or more relevant data silos from the information reduction platform 102. For example, the distributed ledger system 112 may receive the one or more commands instructing the distributed ledger system 112 to provide the first client device 108 with access to the one or more relevant data silos via the communication interface 115 and while the second wireless data connection is established. In some instances, the distributed ledger system 112 may additionally receive the one or more commands directing the first client device 108 to display information corresponding to the relevant data silos to the first user.

At step 213, distributed ledger system 112 may establish a connection with first client device 108. For example, distributed ledger system 112 may establish a fourth wireless data connection with the first client device 108 to link the first client device 108 with the distributed ledger system 112 (e.g., in preparation for sending the one or more relevant data silos). In some instances, the distributed ledger system 112 may identify whether or not a connection is already established with the first client device 108. If a connection is already established with the first client device 108, the distributed ledger system 112 might not re-establish the connection. If a connection is not yet established with the first client device 108, the distributed ledger system 112 may establish the fourth wireless data connection as described above.

At step 214, based on the one or more commands instructing the distributed ledger system 112 to provide the first client device 108 with access to the one or more relevant data silos, the distributed ledger system 112 may send the one or more relevant data silos to the first client device 108. For example, the distributed ledger system 112 may send the one or more relevant data silos to the first client device 108 while the fourth connection is established. Additionally or alternatively, the distributed ledger system 112 may grant the first client device 108 access to the relevant data silos within the distributed ledger system 112. In some examples, the distributed ledger system 112 may additionally send the first client device 108 the one or more commands directing the first client device 108 to display information corresponding to the relevant data silos to the first user.

At step 215, the first client device 108 may receive the one or more relevant data silos from the distributed ledger system 112. For example, the first client device 108 may receive the one or more relevant data silos while the fourth wireless data connection is established. Additionally or alternatively, the first client device 108 may access the one or more relevant data silos within the distributed ledger system 112. For example, the first client device 108 may access (e.g., retrieve for download) the one or more relevant data silos while the fourth wireless data connection is established. In some examples, the first client device 108 may additionally receive the one or more commands directing the first client device 108 to display information corresponding to the relevant data silos to the first user. Based on or in response to the one or more commands to display information corresponding to the relevant data silos, the first client device 108 may display a data silo information interface. In some instances, the data silo information interface may be configured to receive user input through the first client device 108.

For example, in displaying the data silo information interface, the first client device 108 may display a graphical user interface similar to data silo information interface 300, which is illustrated in FIG. 3A. Referring to FIG. 3A, in some instances, the data silo information interface 300 may include information corresponding to the relevant data silos. For example, the data silo information interface 300 may include information corresponding to relevant data silos such as the data use case the relevant data silos will be used for, the suggested or recommended relevant data silos for the data use case, the physical and/or digital sources of the suggested data silos, authenticating information corresponding to the data in the relevant data silos, the memory space occupied by the data in the relevant data silos, the commercial owners of the data in the relevant data silos, and/or other information.

Figure 3B:
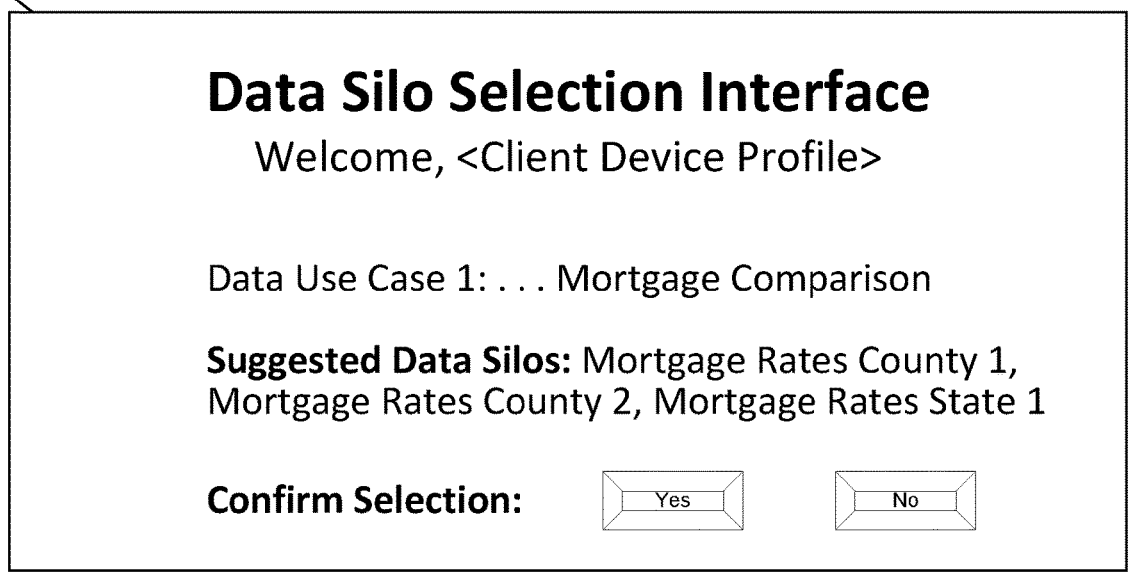

Additionally or alternatively, the first client device 108 may display a data silo selection interface. For example, in displaying the data silo selection interface, the first client device 108 may display a graphical user interface similar to data silo selection interface 310, which is illustrated in FIG. 3B. Referring to FIG. 3B, in some instances, the data silo selection interface 310 may include information corresponding to the first data use case request. For example, the data silo selection interface 310 may include information such as the name of the first data use case request, the purpose of the first data use case request, the data silos that information reduction platform 102 suggests using for the first data use case request, and/or other information. The data silo selection interface 310 may also display input mechanisms requesting user input. For example, the first client device 108 may display one or more of: a button or buttons, toggle or toggles, check box or boxes, and/or other user interface elements. For example, as illustrated in FIG. 3B the input mechanisms may be buttons the user can select to decide whether or not to confirm selection of the suggested data silos.

With further reference to FIG. 2C, at step 216, the first client device 108 may execute the first data use case request. In some examples, based on or in response to the one or more relevant data silos, the first client device 108 may process the data within the one or more relevant data silos (e.g., perform a calculation, run a comparison tool, reorganize the data, and/or otherwise process the data). In some instances, the first client device 108 may then perform its own additional functions or execute its own processes on the relevant data silos separate from the first data use case request.

Referring to FIG. 2D, at step 217, based on the first client device 108 executing the first data use case request, the information reduction platform 102 may monitor the execution of the first data use case request. For example, the information reduction platform 102 may monitor the execution of the first data use case request while the third wireless data connection is established. In some examples, the information reduction platform 102 may identify the efficiency of the one or more relevant data silos in satisfying the first data use case request. The efficiency of the one or more relevant data silos may be identified by the information reduction platform 102 tracking one or more values. For example, the information reduction platform 102 may track one or more of the total amount of data processed, the amount of data processed from each relevant data silo, the total amount of time for the first data use case request to be satisfied (e.g., the time for all of the data in each of the one or more relevant data silos to be processed), the total processor utilization needed to execute the first data use case request, the amount of memory needed to execute the first data use case request, the data upload and download speeds, packet loss, and/or other values. The information reduction platform 102 may compare the tracked one or more values to identify which of the one or more relevant data silos execute the first data use case request most efficiently in relation to a specific parameter (e.g., least amount of memory used, shortest amount of time needed to execute, and/or other specific parameters). Additionally or alternatively, the information reduction platform 102 may compare the tracked one or more values to identify which of the one or more relevant data silos execute the first data use case request most efficiently in relation to a grouping of two or more of the specific parameters.

At step 218, the information reduction platform 102 may generate DVVs for each of the one or more relevant data silos. In some instances, the DVVs of the one or more relevant data silos may be generated by the information reduction platform 102 using the first machine learning model. The information reduction platform 102 may train the first machine learning model to employ a DVV generation algorithm to generate the DVVs of the one or more relevant data silos. In some examples, the DVV generation algorithm may use the values monitored by the information reduction platform 102 in step 217 to generate the DVVs. In some instances, the DVV generation algorithm may include dividing the amount of data in each of the one or more relevant data silos by the amount of time it takes first client device 108 to process the data to produce the DVV. For example, the information reduction platform 102 may execute the following DVV generation algorithm:

$$\frac{\text{(Bits of data in relevant data silo } X\text{)}}{\text{(Total time to process relevant data silo } X\text{)}} = DVV.$$

In some instances, in generating the DVVs, the information reduction platform 102 may generate one or more of: a rate of change of data stored in the corresponding relevant data silo, a decimal value, a percentile, a binary value, and/or other value. Additionally or alternatively, the DVVs may be or include an indicator (e.g., an index key, and digital flag, and/or other indicators) linking the DVV to a corresponding data use case.

Additionally or alternatively, the information reduction platform 102 may execute a combined DVV algorithm to generate a DVV for a combination of one or more relevant data silos. For example, the information reduction platform 102 may add the amount of data in one or more relevant data silos and divide the sum by the total amount of time taken for each of the combined one or more relevant data silos to be processed by first client device 108 while executing the first data use case request. For example, the information reduction platform 102 may execute the following combined DVV algorithm:

$$\frac{\text{(Bits of data in relevant data silo } X + \text{Bits of data in relevant data silo } Y)}{\text{(Total time to process relevant data silo } X + \text{Total time to process relevant data silo } Y)} = DVV.$$

Additionally or alternatively, the information reduction platform 102 may execute the steps described above based on subsets of data within each of the one or more relevant data silos. For example, information reduction platform 102 may use the combined DVV algorithm to generate DVVs for exemplary data subsets A and B within a relevant data silo comprising data subsets A, B, and C.

At step 219, the information reduction platform 102 may generate a weighted velocity score corresponding to the first machine learning model. For example, the information reduction platform 102 may generate the weighted velocity score based on a weighted velocity algorithm. In some examples, the information reduction platform 102 may use the values monitored by the information reduction platform 102 in step 217 to generate the weighted velocity score. Additionally or alternatively, the information reduction platform 102 may use the DVVs corresponding to the relevant data silos to generate the weighted velocity score. For example, the information reduction platform 102 may divide the sum of all the DVVs for each of the one or more relevant data silos used to execute the first data use case request by the sum of all the DVVs for each of the one or more relevant data silos used to execute a similar historical data use case request. For example, the information reduction platform 102 may execute the following weighted velocity algorithm:

$$\frac{\text{Sum of } DVVs \text{ for relevant data silos in first use case} = 3}{\text{Sum of } DVVs \text{ for relevant data silos in historical use case} = 1.5} =$$

Weighted Velocity Score = 2.0.

In some instances, in generating the weighted velocity score, the information reduction platform 102 may generate one or more of: a decimal value, a percentile, a binary value, and/or other value.

At step 220, based on the DVVs generated by the information reduction platform 102, the information reduction platform 102 may assign the DVVs to each of the corresponding one or more relevant data silos. In some instances, assigning the DVVs to each of the corresponding one or more relevant data silos may comprise linking each DVV to the corresponding relevant data silo, such as by creating a digital index, storing each DVV in the corresponding relevant data silo, creating a shared folder or file associating each DVV with the corresponding relevant data use silo, and/or other linking methods. In some examples, the DVVs may include a growth score assigned by the information reduction platform 102. For example, the information reduction platform 102 may track changes over time in the DVVs assigned to each of the corresponding one or more relevant data silos and assign a growth score indicating a rate of increase in the DVV over time. In some instances, the DVVs assigned to the one or more relevant data silos may be stored in internal memory of information reduction platform 102, and/or external memory.

Figure 2E:
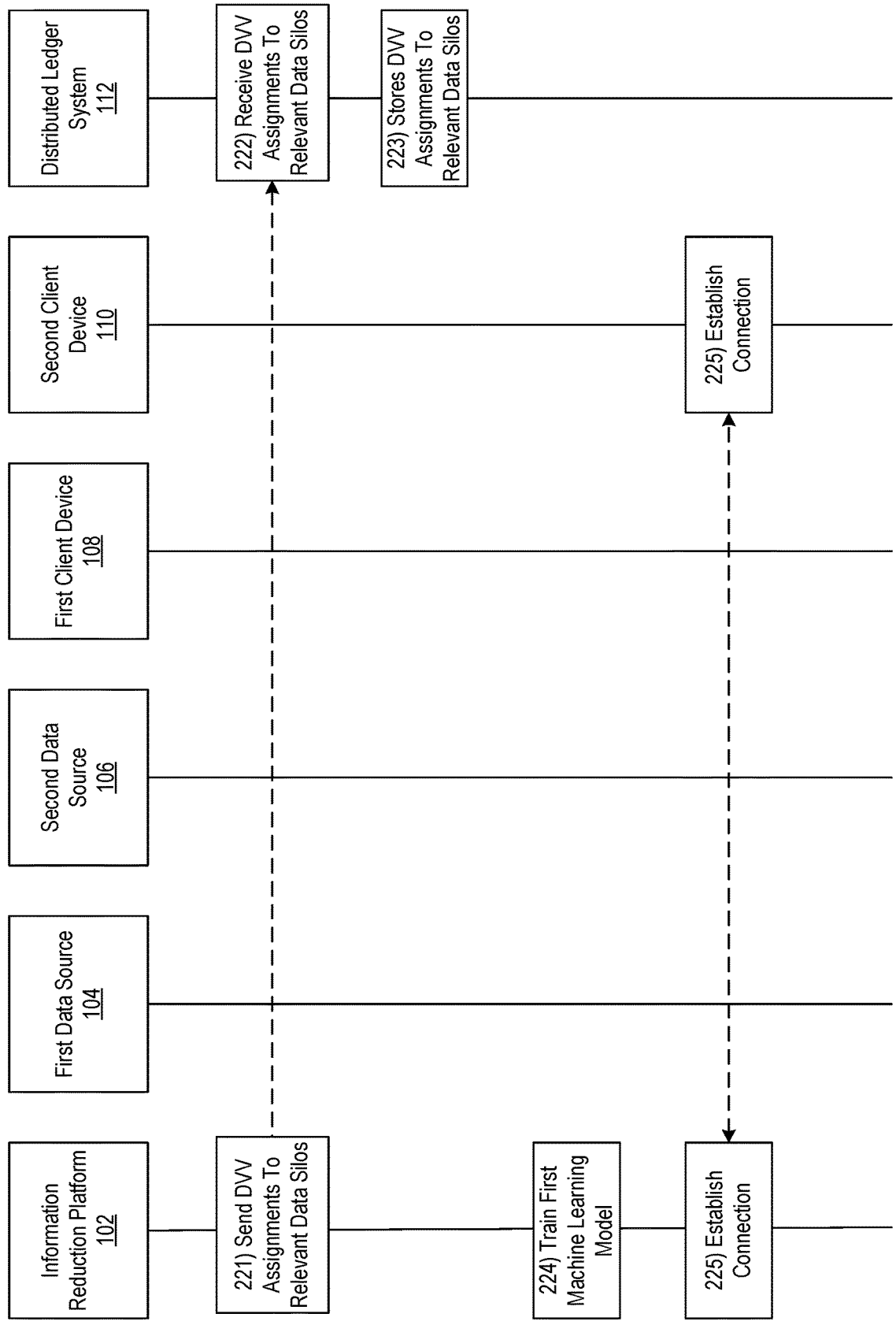

Referring to FIG. 2E, at step 221, the information reduction platform 102 may send the DVV assignments corresponding to the one or more relevant data silos to the distributed ledger system 112. For example, the information reduction platform 102 may send the DVV assignments via the communication interface 115 and while the second wireless data connection is established. In some instances, in sending the DVV assignments, the information reduction platform 102 may additionally send the weighted velocity score (corresponding to the first machine learning model) to the distributed ledger system 112.

At step 222, the distributed ledger system 112 may receive the DVV assignments corresponding to the one or more relevant data silos from the information reduction platform 102. For example, the distributed ledger system 112 may receive the DVV assignments corresponding to the one or more relevant data silos while the second wireless data connection is established. In some instances, in receiving the DVV assignments, the distributed ledger system 112 may additionally receive the weighted velocity score corresponding to the first machine learning model from the information reduction platform 102.

At step 223, the distributed ledger system 112 may store the DVV assignments corresponding to the one or more relevant data silos. In some instances, the distributed ledger system 112 may store the DVV assignments to a distributed ledger such as a blockchain, holo-chain, merkle tree, and/or other distributed ledger hosted by the distributed ledger system 112. For example, the distributed ledger system 112 may create a new block or node of the distributed ledger (e.g., modify the distributed ledger), and may store the DVV assignments in the new block accordingly. In some instances, the distributed ledger system 112 may additionally store the weighted velocity score, corresponding to the first machine learning model, to the distributed ledger.

At step 224, the information reduction platform 102 may train the first machine learning model based on the DVV assignments. In some instances, the information reduction platform 102 may train the first machine learning model to, using the DVVs, select a subset of relevant data silos for a particular data use case. For example, the first machine learning model may be trained to select a subset of relevant data silos that includes more efficient data (e.g., a subset of data with higher or otherwise better DVV scores) for the particular data use case than the remaining data in the relevant data silos. In some instances, the first machine learning model may be trained to select the subset of relevant data silos using an algorithm. For example, the information reduction platform 102 may execute an algorithm that includes the following constraints/parameters: if subset A of the relevant data silos for the particular data use case and subset B of the relevant data silos for the particular use case both satisfy the particular data use case, then if the sum of the DVVs in subset A is ≥the sum of the DVVs in subset B, only subset A should be selected for the particular data use case.

Additionally or alternatively, in some instances, based on the weighted velocity score corresponding to the first machine learning model, the information reduction platform 102 may generate, train, and/or otherwise update a second machine learning model. In some examples, the information reduction platform 102 may generate a second machine learning model to be trained based on different DVV assignments. For example, the information reduction platform 102 may determine that the weighted velocity score is below a threshold value (e.g., the weighted velocity score is below a threshold value of 5 on a scale of 1-10) and that a second machine learning model should be generated based on the weighted velocity score being below the threshold value.

In doing so, the information reduction platform 102 may more effectively train the second machine learning model. For example, the information reduction platform 102 may train the second machine learning model to select the most appropriate data for a particular data use case. This may reduce the resources necessary to perform or execute a particular data use case and/or reduce the time needed to complete the particular data use case.

At step 225 the second client device 110 may establish a connection with the information reduction platform 102. For example, the second client device 110 may establish a fifth wireless data connection with the information reduction platform 102 to link the second client device 110 with the information reduction platform 102. In some instances, the second client device 110 may identify whether or not a connection is already established with the information reduction platform 102. If a connection is already established with the information reduction platform 102, the second client device 110 might not re-establish the connection. If a connection is not yet established with the information reduction platform 102, the second client device 110 may establish the fifth wireless data connection as described above.

Figure 2F:
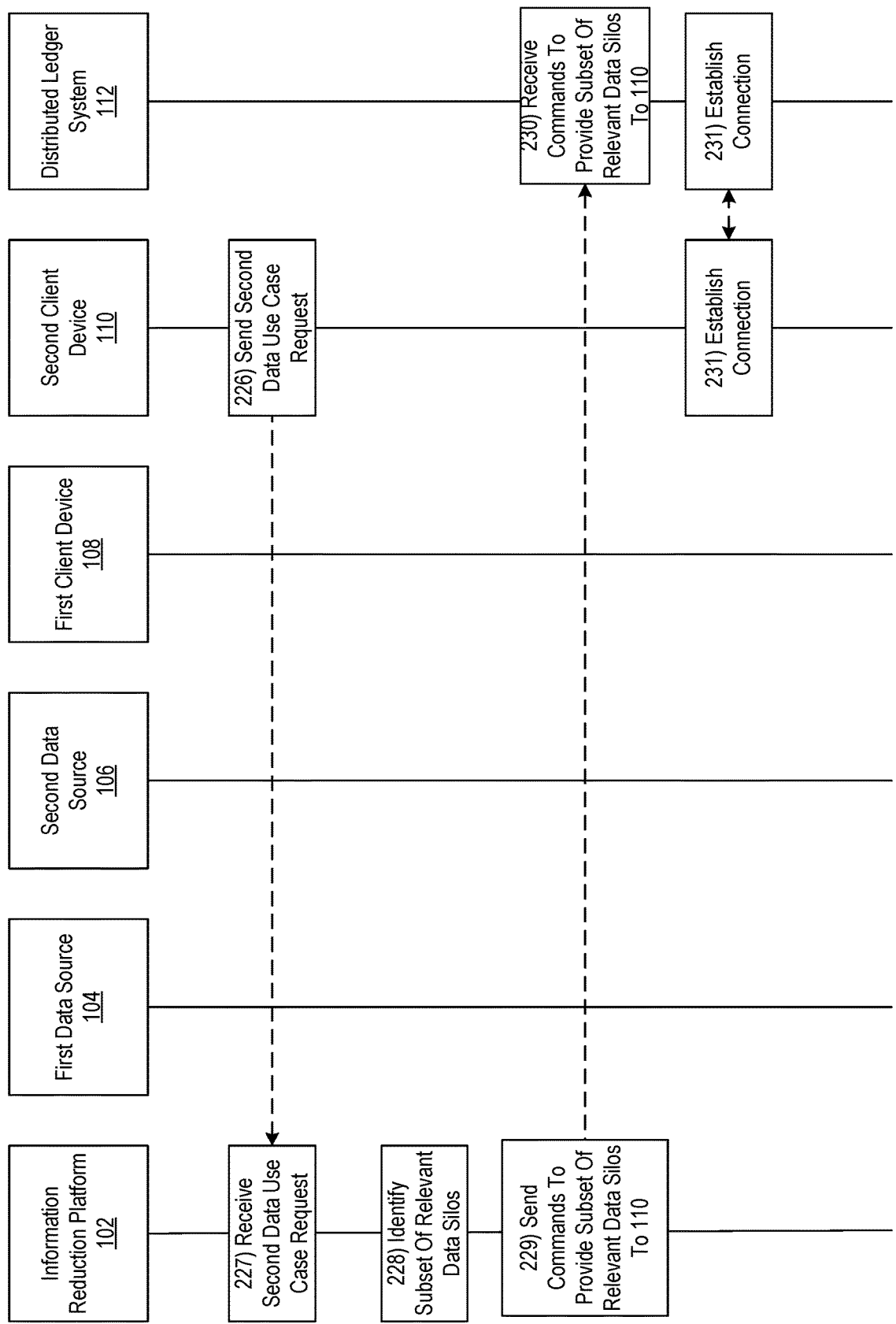

Referring to FIG. 2F, at step 226, the second client device 110 may send a second data use case request to the information reduction platform 102. For example, the second client device 110 may send the second data use case request via the communication interface 115 and while the fifth wireless data connection is established. The second data use case request may be the same as or different from the first data use case request. In some instances, in sending the second data use case request, the second client device 110 may send a request to use some subset of the data stored in the distributed ledger system 112 to execute a particular data use case. For example, the second client device 110 may send a request to use data pertaining to housing costs to calculate inflation, to use data pertaining to a financial account to track its growth over time, and/or other functions At step 227, the information reduction platform 102 may receive the second data use case request from the second client device 110. For example, the information reduction platform 102 may receive the second data use case request via the communication interface 115 and while the fifth wireless data connection is established. In some instances, the information reduction platform 102 may store the second data use case request in internal memory of information reduction platform 102, and/or external memory.

At step 228, the information reduction platform 102 may identify a subset of relevant data silos corresponding to the second data use case request. In some instances, if the second data use case request is different from the first data use case request, the information reduction platform 102 may first identify one or more relevant data silos corresponding to the second data use case request. In some instances, to identify the one or more relevant data silos the information reduction platform 102 may first identify the purpose of the second data use request. For example, the information reduction platform 102 may identify that the purpose of the second data use case request is to calculate mortgage rates in a specific area. In some examples, to identify the one or more relevant data silos, the information reduction platform 102 may apply natural language processing to the second data use case request to identify keywords pertaining to the purpose of the second data use case request (e.g., housing, mortgage rate, county, area, and/or other words). The information reduction platform 102 may apply natural language processing to the data silos to identify which data silos include data relevant to the purpose of the second data use case request. In some instances, the one or more relevant data silos corresponding to the second data use case request may be stored in internal memory of information reduction platform 102, and/or external memory.

In some instances, the information reduction platform 102 may use the first machine learning model to identify the subset of relevant data silos corresponding to the second data use case request. In some examples, the information reduction platform 102 may use the first machine learning model to identify which subsets of the one or more relevant data silos corresponding to the second data use case request comprise data that can be used to execute some portion of the second data use case request. For example, if the second data use case request comprises tasks 1 and 2, the first machine learning model may identify (e.g., by using DVV assignments comprising an indicator for the particular data use case) that subsets A and B of the relevant data silos each comprise data that can be used to execute task 1, and subsets C and D each comprise data that can be used to execute task 2. Additionally or alternatively, in some instances, the first machine learning model may use the assigned DVVs to identify the subset of relevant data silos corresponding to the second data use case request. For example, the first machine learning model may identify (e.g., by using DVV assignments comprising an indicator for the particular data use case) that subsets A and B of the relevant data silos each comprise data that can be used to execute some or all aspects of the second data use case request. The first machine learning model may use an algorithm to execute such aspects. For example, the algorithm may include the following constraints/parameters: if the DVV of subset A>the DVV of subset B, only subset A should be identified as part of the subset of relevant data silos for the second data use case, but if the DVV of subset B>the DVV of subset A, only subset B should be identified as part of the subset of relevant data silos corresponding to the second data use case request.

In some instances, the information reduction platform 102 may input the second data use case request into one or more additional machine learning models. Each of the one or more additional machine learning models may comprise a weighted velocity score. In some examples, the second machine learning model may be one of the one or more additional machine learning models. In some instances, the information reduction platform 102 may use the one or more machine learning models to identify the subset of relevant data silos. For example, the information reduction platform 102 may input the second data use case into the one or more additional machine learning models and identify the subset of relevant data silos by comparing the one or more additional machine learning models with the first machine learning model. In some instances, based on comparing the one or more additional machine learning models with the first machine learning model, the information reduction platform 102 may identify a core machine learning model for the particular data use case request (e.g., the second data use case request). In some instances, the information reduction platform 102 may identify the core machine learning model based on criteria such as which machine learning model has the highest weighted velocity score, which machine learning model produces the highest average DVVs, and/or other criteria. The core machine learning model may be the first machine learning model that information reduction platform 102 first uses for a particular use case, the first machine learning model that information reduction platform 102 uses the most frequently for a particular use case, and/or the first machine learning model that the information reduction platform 102 otherwise prioritizes.

At step 229, the information reduction platform 102 may send one or more commands instructing the distributed ledger system 112 to provide the second client device 110 with access to the subset of relevant data silos corresponding to the second data use case request. For example, the information reduction platform 102 may send the one or more commands to the distributed ledger system 112 and while the second connection is established. In some instances, the information reduction platform 102 may additionally send one or more commands directing the second client device 110 to display information corresponding to the relevant data silos to the second user.

At step 230, distributed ledger system 112 may receive the one or more commands instructing the distributed ledger system 112 to provide the second client device 110 with access to the subset of relevant data silos from the information reduction platform 102. For example, the distributed ledger system 112 may receive the one or more commands instructing the distributed ledger system 112 to provide the second client device 110 with access to the subset of relevant data silos corresponding to the second data use case request while the second wireless data connection is established. In some instances, the distributed ledger system 112 may additionally receive the one or more commands directing the second client device 110 to display information corresponding to the relevant data silos to the second user.

At step 231, distributed ledger system 112 may establish a connection with second client device 110. For example, distributed ledger system 112 may establish a sixth wireless data connection with the second client device 110 to link the second client device 110 with the distributed ledger system 112 (e.g., in preparation for sending the one or more relevant data silos). In some instances, the distributed ledger system 112 may identify whether or not a connection is already established with the second client device 110. If a connection is already established with the second client device 110, the distributed ledger system 112 might not re-establish the connection. If a connection is not yet established with the second client device 110, the distributed ledger system 112 may establish the sixth wireless data connection as described above.

Figure 2G:
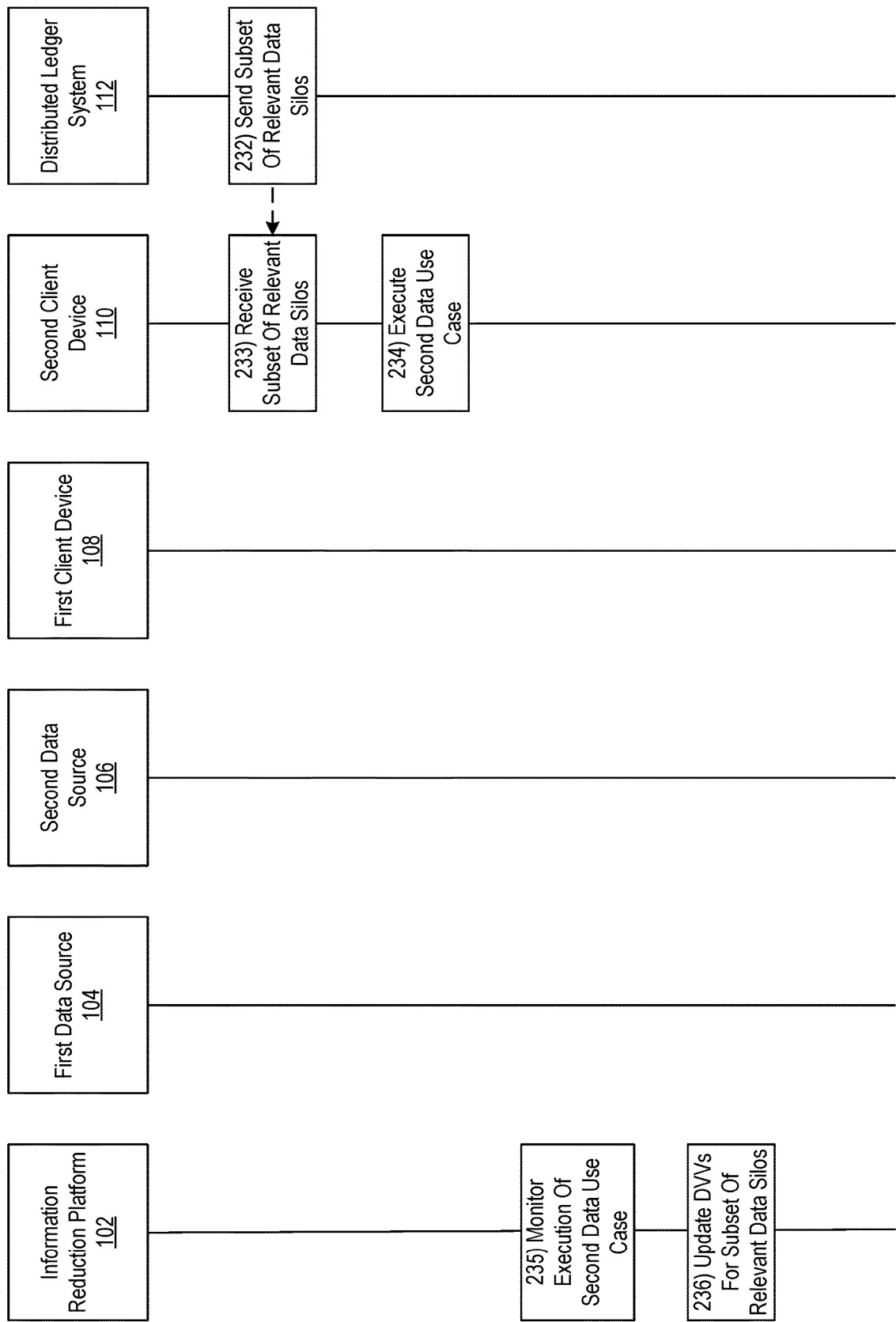

Referring to FIG. 2G, at step 232, based on the one or more commands instructing the distributed ledger system 112 to provide the second client device 110 with access to the subset of relevant data silos corresponding to the second data use case request, the distributed ledger system 112 may send the subset of relevant data silos to the second client device 110. For example, the distributed ledger system 112 may send the subset of relevant data silos to the second client device 110 while the sixth connection is established. Additionally or alternatively, the distributed ledger system 112 may grant the second client device 110 access to the subset of relevant data silos within the distributed ledger system 112. In some examples, the distributed ledger system 112 may additionally send the second client device 110 the one or more commands directing the second client device 110 to display information corresponding to the relevant data silos to the second user.

At step 233, the second client device 110 may receive the subset of relevant data silos from the distributed ledger system 112. For example, the second client device 110 may receive the subset of relevant data silos while the sixth wireless data connection is established. Additionally or alternatively, the second client device 110 may access the subset of relevant data silos within the distributed ledger system 112. For example, the second client device 110 may access (e.g., retrieve for download) the subset of relevant data silos while the sixth wireless data connection is established. In some examples, the second client device 110 may additionally receive the one or more commands directing the second client device 110 to display information corresponding to the relevant data silos to the second user. Based on or in response to the one or more commands to display information corresponding to the relevant data silos, the second client device 110 may display a data silo manual update interface. In some instances, the data silo manual update interface may be configured to receive user input through the second client device 110.

Figure 3C:
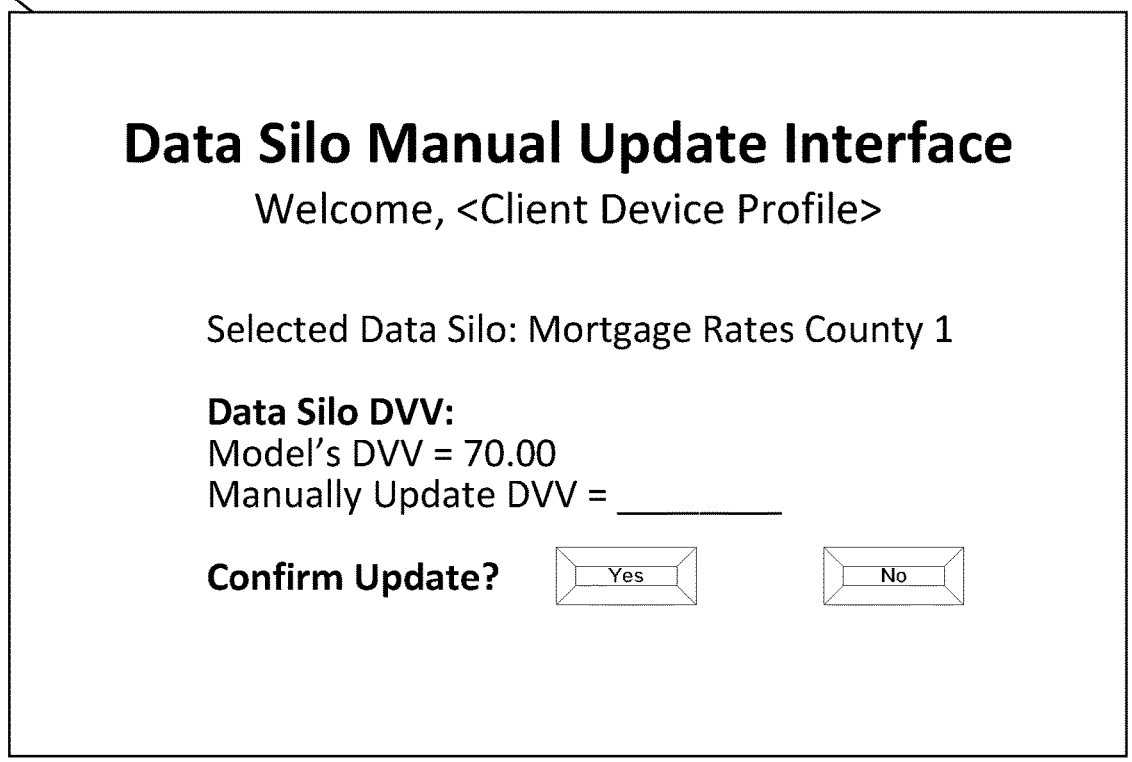

For example, in displaying the data silo manual selection interface, the second client device 110 may display a graphical user interface similar to data silo manual update interface 320, which is illustrated in FIG. 3C. Referring to FIG. 3C, in some instances, the data silo manual selection interface 320 may include information corresponding to the relevant data silos. For example, the data silo manual selection interface 320 may include information of a selected data silo and/or subset of a data silo, the DVV of the data silo or subset of the data silo, and/or other information. The data silo manual update interface 320 may also display selectable input options for receiving user input. For example, the second client device 110 may display one or more of: a button or buttons, toggle or toggles, check box or boxes, and/or other user interface elements. For example, as illustrated in FIG. 3C the input options may be boxes or blank fields the user can enter a value in to manually update the DVV of the selected data silo, and/or buttons the user can select to decide whether or not to confirm update of the DVV of the selected data silo. In some instances, based on receiving input from the second user to manually update the DVV of a selected data silo, the second client device 110 may send the manually updated DVV to the information reduction platform 102.

At step 234, the second client device 110 may execute the second data use case request. In some examples, based on or in response to the subset of relevant data silos, the second client device 110 may process the data within the subset of relevant data silos (e.g., perform a calculation, run a comparison tool, reorganize the data, and/or otherwise process the data). In some instances, the second client device 110 may then perform its own additional functions or execute its own processes on the subset of relevant data silos separate from second data use case request.

At step 235, based on the second client device 110 executing the second data use case request, the information reduction platform 102 may monitor the execution of the second data use case request. For example, the information reduction platform 102 may monitor the execution of the second data use case request while the fifth wireless data connection is established. In some examples, the information reduction platform 102 may identify the performance of the subset of relevant data silos in satisfying the second data use case request. The performance of the subset of relevant data silos may be identified by the information reduction platform 102 tracking one or more values. For example, the information reduction platform 102 may track one or more of the total amount of data processed, the amount of data processed from each relevant data silo, the total amount of time for the second data use case request to be satisfied (e.g., the time for all of the data in each of the one or more relevant data silos to be processed), the amount of processing power needed to execute the second data use case request, the amount of memory needed to execute the second data use case request, and/or other values. In some instances, the information reduction platform 102 may also monitor the second client device 110 for manually updated DVVs sent by the second client device 110 to the information reduction platform 102. For example, the information reduction platform 102 may receive one or more manually updated DVVs corresponding to selected relevant data silos from the second client device 110.

At step 236, the information reduction platform 102 may update the DVVs for the subset of relevant data silos. In some instances, the DVVs of the subset of relevant data silos may be updated by the information reduction platform 102 using the first machine learning model. The information reduction platform 102 may train the first machine learning model to employ an algorithm to update the DVVs of the subset of relevant data silos. In some examples, the algorithm may use the values monitored by the information reduction platform 102 in step 217 to update the DVVs. Additionally or alternatively, the information reduction platform 102 may use the manually updated DVVs sent by the second client device 110. In some instances, the algorithm may include dividing the amount of data in each relevant data silo of the subset of relevant data silos by the amount of time it takes second client device 110 to process the data to produce DVV. In some instances, in updating the DVVs, the information reduction platform 102 may update one or more of: a rate of change of data stored in the corresponding relevant data silo, a decimal value, a percentile, a binary value, and/or other value. In some instances, the information reduction platform may generate new DVVs, using the steps described in step 218. Additionally or alternatively, the DVVs may comprise an indicator (e.g., an index key, and digital flag, and/or other indicators) linking the DVV to a corresponding data use case, which may, in some instances, be updated by the information reduction platform 102.

Additionally or alternatively, the algorithm may additionally comprise updating a DVV for one or more relevant data silos, in the subset of relevant data silos, combined. For example, the algorithm may comprise adding the amount of data in one or more relevant data silos and dividing the sum by the total amount of time taken for each of the combined one or more relevant data silos to be processed by second client device 110 while executing the second data use case request. The algorithm may perform the steps described above based on an equation, such as:

$$\frac{\text{(Bits of data in relevant data silo } X + \text{Bits of data in relevant data silo } Y)}{\text{(Total time to process relevant data silo } X + \text{Total time to process relevant data silo } Y)} = \text{updated } DVV.$$

Additionally or alternatively, the algorithm may compare the original DVV with the updated DVV. The algorithm may only replace the original DVV with the updated DVV if the original DVV<the updated DVV.

Figure 2H:
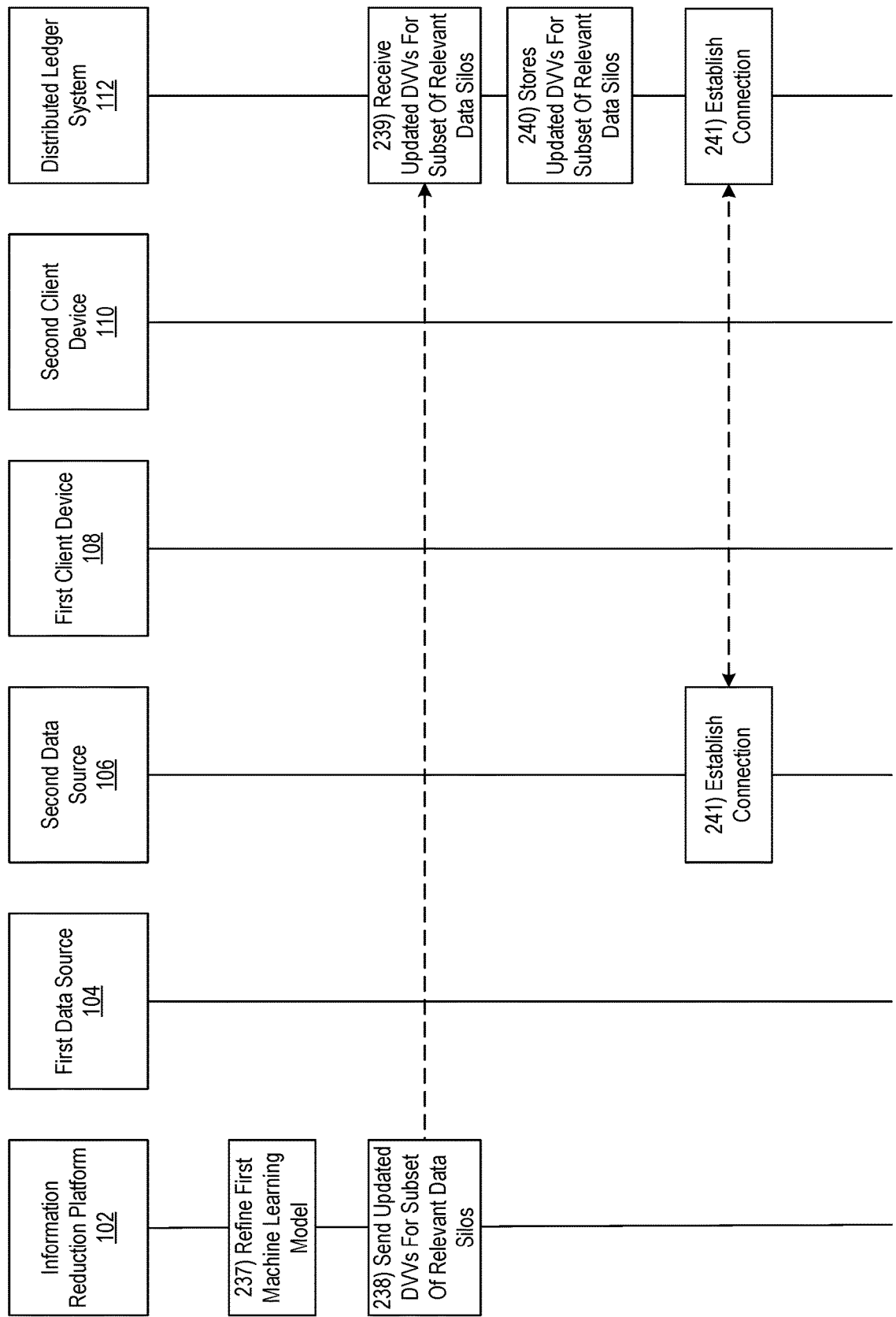

Referring to FIG. 2H, at step 237, the information reduction platform 102 may refine the first machine learning model based on the updated DVVs. In some instances, refining the first machine learning model may include analyzing one or more of the performance of the subset of relevant data silos, the weighted velocity score corresponding to the first machine learning model, the original DVV assignments, the updated DVVs, the growth scores corresponding to the DVVs, and/or other factors. Additionally or alternatively, refining the first machine learning model may include inputting the updated DVVs into the first machine learning model. By inputting the updated DVVs into the first machine learning model, the information reduction platform 102 may create an iterative feedback loop that may continuously and dynamically refine the first machine learning model to improve its accuracy. For example, information reduction platform 102 may identify that a second subset of the relevant data silos performed better than the subset of the relevant data silos in executing the second data use case request. In these instances, the information reduction platform 102 may refine the first machine learning model to select the second subset of the relevant data silos in future iterations of the feedback loop to execute the second data use case request. In doing so, the information reduction platform 102 may improve accuracy and effectiveness of the data silo selection process by the first machine learning model, which may, e.g., results in more efficient training of models trained by the selected data silos (and may in some instances, conserve computing and/or processing power/resources in doing so).

At step 238, the information reduction platform 102 may send the updated DVVs to the distributed ledger system 112. For example, the information reduction platform 102 may send the updated DVVs via the communication interface 115 and while the second wireless data connection is established. In some instances, the information reduction platform 102 may additionally send one or more commands directing the distributed ledger system 112 to modify a stored distributed ledger to include the updated DVVs. In some examples, the one or more commands directing the distributed ledger system 112 to modify a stored distributed ledger to include the updated DVVs may further include one or more commands directing the distributed ledger system 112 to modify the stored distributed ledger to include the growth scores corresponding to the updated DVVs.

At step 239, the distributed ledger system 112 may receive the updated DVVs from the information reduction platform 102. For example, the distributed ledger system 112 may receive updated DVVs while the second wireless data connection is established. In some instances, the distributed ledger system 112 may additionally receive the one or more commands directing the distributed ledger system 112 to modify a stored distributed ledger to include the updated DVVs.

At step 240, the distributed ledger system 112 may store the updated DVVs. In some instances, the distributed ledger system 112 may store the updated DVVs to a distributed ledger such as a blockchain, holo-chain, merkle tree, and/or other distributed ledger hosted by the distributed ledger system 112 (which may, e.g., be the same distributed ledger described above at steps 222 and 223). In some instances, based on receiving the one or more commands directing the distributed ledger system 112 to modify the stored distributed ledger to include the updated DVVs, the distributed ledger system 112 may modify the stored distributed ledger to include the updated DVVs. For example, the distributed ledger system 112 may create a new block or node of the distributed ledger (e.g., modify the distributed ledger), and may store the updated DVVs in the new block accordingly.

At step 241, the distributed ledger system 112 may establish a connection with second data source 106. For example, distributed ledger system 112 may establish a seventh wireless data connection with the second data source 106 to link the second data source 106 with the distributed ledger system 112 (e.g., in preparation for sending the one or more relevant data silos). In some instances, the distributed ledger system 112 may identify whether or not a connection is already established with the second data source 106. If a connection is already established with the second data source 106, the distributed ledger system 112 might not re-establish the connection. If a connection is not yet established with the second data source 106, the distributed ledger system 112 may establish the seventh wireless data connection as described above.

Figure 2I:
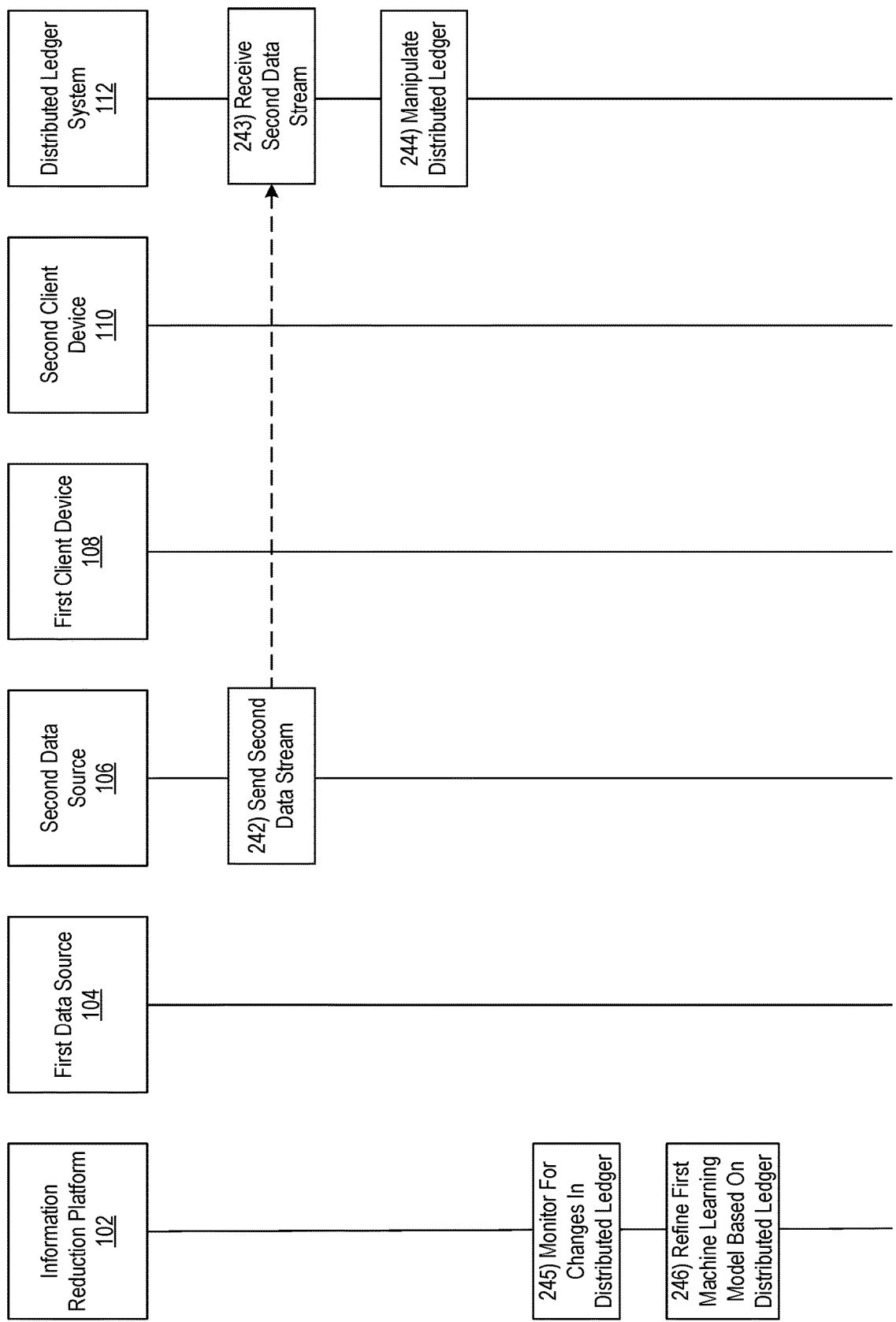

Referring to FIG. 2I, at step 242, once a connection has been established, the second data source 106 may send a second data stream to the distributed ledger system 112. For example, the second data source 106 may send the second data stream while the seventh wireless data connection is established.

In some instances, in sending the second data stream, the second data source 106 may send new sets of data, relevant data silos for particular use cases, DVV assignments for relevant data silos, machine learning model data, one or more second machine learning models, and/or other data. In some instances, new sets of data may include mortgage rates, commercial transactions, demographic data, client information, and/or other data. In some instances, the new sets of data may have originated from the first user, an employee/client of an enterprise organization (e.g., a financial institution), and/or other sources. At step 243, distributed ledger system 112 may receive the second data stream from the second data source 106. For example, the distributed ledger system 112 may receive the second data stream and while the seventh wireless data connection is established. In some instances, the distributed ledger system 112 may store the second data stream in the distributed ledger.

At step 244, based on receiving the second data stream, the distributed ledger system 112 may modify the distributed ledger. In some instances, the distributed ledger system 112 may store the second data stream to a distributed ledger such as a blockchain, holo-chain, merkle tree, and/or other distributed ledger hosted by the distributed ledger system 112 (which may e.g., be the same distributed ledger described above at steps . . . ). For example, the distributed ledger system 112 may create a new block or node of the distributed ledger (e.g., modify the distributed ledger), and may store the second data stream in the new block accordingly.

At step 245, the information reduction platform 102 may monitor the distributed ledger for changes in the distributed ledger. In some examples, the information reduction platform 102 may monitor the stored ledger for new data streams, within which the information reduction platform 102 may need to identify data silos. Additionally or alternatively, in some instances, the information reduction platform 102 may monitor the stored distributed ledger for second machine learning models recorded to the stored to the distributed ledger.

At step 246, the information reduction platform 102 may refine the first machine learning model based on any detected changes in the distributed ledger. In some examples, the information reduction platform 102 may refine the first machine learning model to identify new relevant data silos and/or new subsets of relevant data silos based on the changes (e.g., new data, one or more second machine learning models, and/or other changes) in the distributed ledger. Additionally or alternatively, in some instances the information reduction platform 102 may refine the first machine learning model by inputting new data into the preexisting relevant data silos or subsets of relevant data silos identified by the first machine learning model. Additionally or alternatively, in some instances, the information reduction platform 102 may refine the first machine learning model based on the second machine learning models. For example, the information reduction platform 102 may integrate the relevant data silos and corresponding DVVs from the second machine learning model into the first machine learning model. In some instances, the first machine learning model may replace relevant data silos corresponding to the first machine learning model with select relevant data silos corresponding to the second machine learning model. The first machine learning model may use an algorithm to replace the relevant data silos. For example, the algorithm may be that if a select relevant data silo corresponding to the second machine learning model has a DVV that is higher than the DVV of a relevant data silo corresponding to the first machine learning model, the first machine learning model replaces the relevant data silo with the select relevant data silo.

Although these steps as described above are primarily described as being performed by a combination of the information reduction platform 102 and distributed ledger system 112, this is for illustrative purposes only. These steps may be performed by the first client device 108 or the second client device 110 in combination with the information reduction platform 102, or by the information reduction platform 102 alone, without departing form the scope of the disclosure.

Figure 4A:
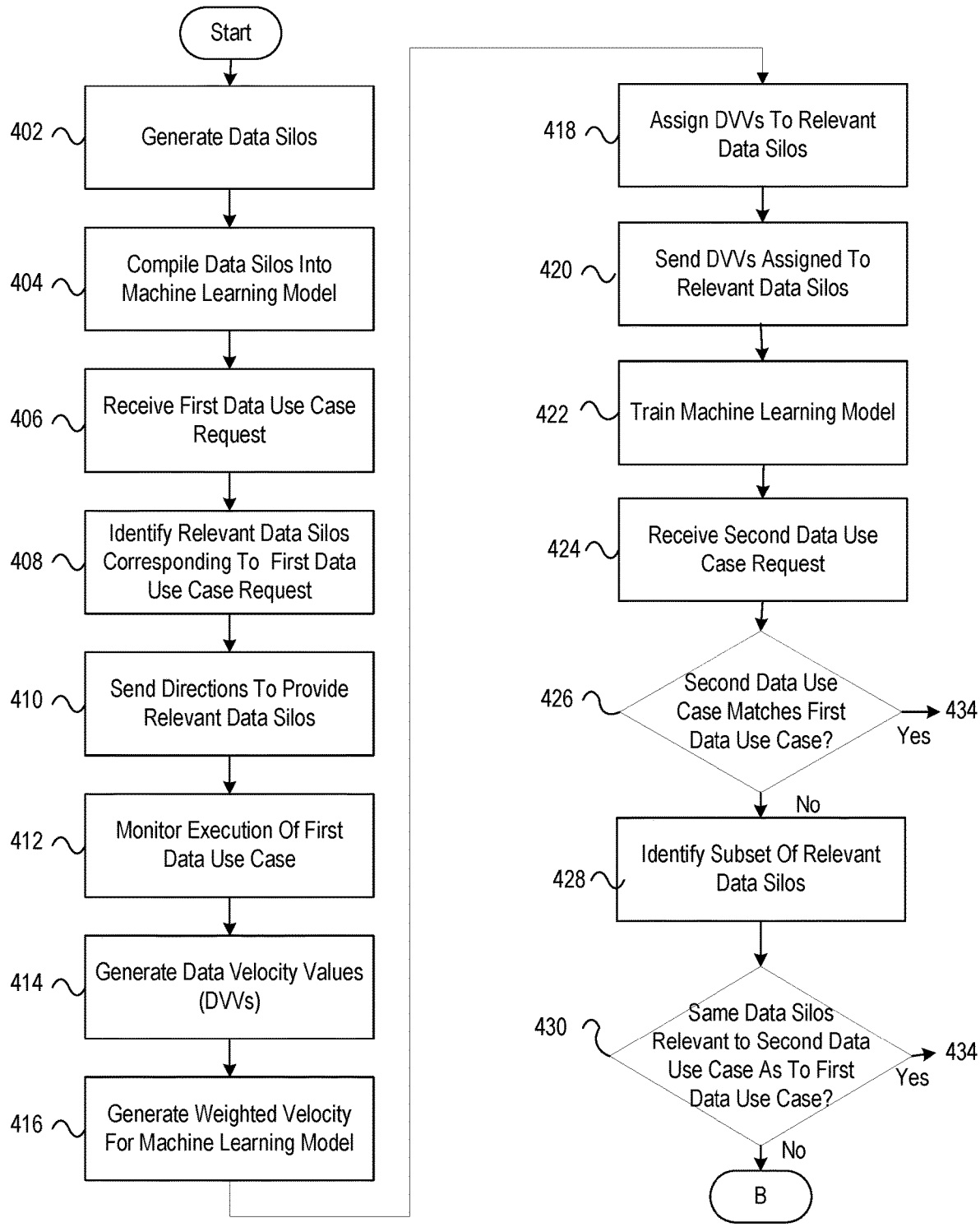
FIGS. 4A-4B depict illustrative methods for dynamically reducing data information using a machine learning model in accordance with one or more example embodiments.
Figure 4B:
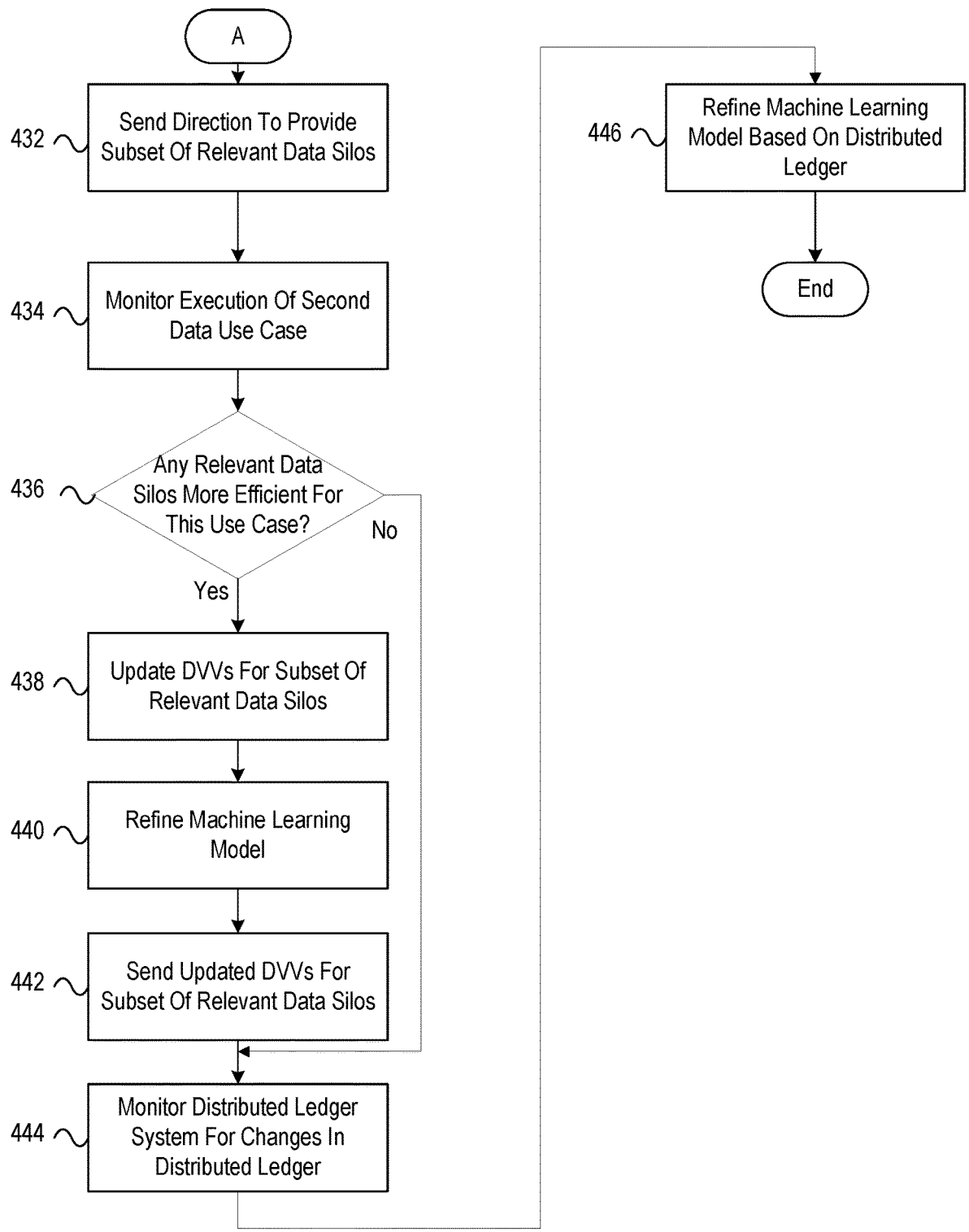

FIGS. 4A and 4B depict an illustrative method for dynamically reducing data using a machine learning model in accordance with one or more example embodiments. Referring to FIG. 4A, at step 402 a computing platform having at least one processor, a communication interface, and memory may generate data silos with data stored in a distributed ledger system. At step 404, the computing platform may compile the data silos into a machine learning model. At step 406, the computing platform may receive a first data use case request from a first client device. At step 408, the computing platform may identify a subset of relevant data silos (e.g., a first subset of relevant data silos) corresponding to the first data use case request. At step 410, the computing platform may send the distributed ledger system commands to provide access to the first subset of relevant data silos to the first client device. At step 412, the computing platform may monitor the execution of the first data use case by the first client device. At step 414, the computing platform may generate data velocity values (DVVs) based on monitoring the execution of the first data use case. At step 416, the computing platform may generate a weighted velocity model for the first machine learning model based on monitoring the execution of the first data use case.

At step 418, the computing platform may assign DVVs to the first subset of relevant data silos. At step 420, the computing platform may send the DVVs assigned to the first subset of relevant data silos in step 418 to the distributed ledger system. At step 422, the computing platform may train the first machine learning model based on the DVVs assigned to the relevant data silos. At step 424, the computing platform may receive a second data use case request from a second client device. At step 426, the computing platform may identify whether or not the second data use case matches the first data use case. Based on identifying that the second data use case does match the first data use case, the method may send the distributed ledger system commands to provide access to the first subset of relevant data silos to the second client device and progress to step 434 in FIG. 4B. Based on identifying that the second data use case does not match the first data use case, the method may progress to step 428.

At step 428, the computing platform may identify a second subset of the relevant data silos corresponding to the second data use case request. At step 430, the computing platform may identify whether or not the first subset of relevant data silos includes the same data silos as the second subset. Based on identifying that the first subset of relevant data silos includes the same data silos as the second subset, the method may send the distributed ledger system commands to provide access to the first subset of data silos identified to the second client device and progress to step 434 in FIG. 4B. Based on identifying that the first subset of relevant data silos does not include the same data silos as the second subset, the method may progress to step 432 in FIG. 4B.

With reference to FIG. 4B, at step 432, the computing platform may send the distributed ledger system commands to provide access to the second subset of relevant data silos. At step 434, the computing platform may monitor execution of the second data use case. At step 436, the computing platform may use the first machine learning model to identify whether or not any of the relevant data silos used to execute the second data use case were more efficient in executing that data use case than their corresponding DVVs indicated. Based on identifying that none of the relevant data silos used to execute the second data use case were more efficient in executing that data use case than their corresponding DVVs indicate, the method may progress to step 444. Based on identifying that one or more of the relevant data silos used to execute the second data use case were more efficient in executing that data use case than their corresponding DVVs indicated, the method may progress to step 438.

At step 438, the computing platform may update the DVVs for the subset of relevant data silos that were more efficient in executing the data use case than their corresponding DVVs indicated. At step 440, the computing platform may refine the first machine learning model based on the updated DVVs for the subset of relevant data silos.

At step 442, the computing platform may send the updated DVVs for the subset of relevant data silos to the distributed ledger system. At step 444, the computing platform may monitor the distributed ledger system for changes in the distributed ledger. At step 446, the computing platform may refine the first machine learning model based on changes in the distributed ledger.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   generate data silos within a distributed ledger system, the data silos corresponding to individual data use cases;
   receive, from a first client device corresponding to a first user, a first data use case request;

identify, based on the first data use case request, relevant data silos corresponding to the first data use case request;

direct the distributed ledger system to grant access, for the first client device, to the relevant data silos;

monitor the distributed ledger system and the first client device to identify efficiency of the relevant data silos in satisfying the first data use case request;

generate, based on the efficiency of the relevant data silos, a data velocity value (DVV) for each relevant data silo, wherein each DVV indicates a rate of change of data stored in the corresponding relevant data silo;

train, based on the DVVs for each relevant data silo, a first machine learning model to select, for a particular data use case, a subset of the relevant data silos for the particular data use case, wherein the subset of the relevant data silos for the particular data use case comprises more efficient data for the particular data use case than remaining data of the relevant data silos;

receive, via a second client device corresponding to a second user, a second data use case request;

identify, by inputting the second data use case request into the first machine learning model, a subset of relevant data silos for the second data use case request;

monitor performance of the subset of relevant data silos for the second data use case request;

update, based on the performance of the subset of relevant data silos, the DVVs for the subset of relevant data silos for the second data use case request;

send, to the distributed ledger system, the updated DVVs and one or more commands directing the distributed ledger system to modify a stored distributed ledger to include the updated DVVs, wherein sending the one or more commands directing the distributed ledger system to modify the stored distributed ledger to include the updated DVVs causes the distributed ledger system to modify the stored distributed ledger to include the updated DVVs; and input the updated DVVs into the first machine learning model to refine the first machine learning model.

2. The computing platform of claim 1, wherein the memory stores additional computer-readable instructions that, when executed by the at least one processor, cause the computing platform to:

send one or more commands directing the first client device to display information of the relevant data silos, wherein sending the one or more commands directing the first client device to display the information of the relevant data silos causes the first client device to display the information of the relevant data silos.

3. The computing platform of claim 2, wherein the information of the relevant data silos comprises one or more of: physical sources of the data in the relevant data silos, commercial owners of the data in the relevant data silos, digital sources of the data in the relevant data silos, memory space occupied by the data in the relevant data silos, DVVs of the relevant data silos, or authenticating information corresponding to the data in the relevant data silos.

4. The computing platform of claim 2, wherein the memory stores additional computer-readable instructions that, when executed by the at least one processor, cause the computing platform to:

receive, from the first client device, one or more commands directing the first machine learning model to assign one or more specific DVVs to one or more specific relevant data silos;

receive, from the first client device, one or more commands directing the first machine learning model to select a particular subset of the relevant data silos for the particular data use case; and update, based on the one or more commands, the DVVs for the one or more specific relevant data silos.

5. The computing platform of claim 1, wherein the memory stores additional computer-readable instructions that, when executed by the at least one processor, cause the computing platform to:

generate, based on the efficiency of the subset of the relevant data silos, a weighted velocity score corresponding to the first machine learning model; and send the weighted velocity score corresponding to the first machine learning model to the distributed ledger system.

6. The computing platform of claim 5, where the computing platform is configured to:

generate, based on the weighted velocity score, a second machine learning model.

7. The computing platform of claim 1, wherein identifying the subset of relevant data silos comprises inputting the second data use case request into one or more additional machine learning models.

8. The computing platform of claim 7, wherein each of the one or more additional machine learning models comprises a weighted velocity score, wherein identifying the subset of relevant data silos further comprises comparing the weighted velocity scores.

9. The computing platform of claim 8, wherein the memory stores additional computer-readable instructions that, when executed by the at least one processor, cause the computing platform to:

identify, based on comparing the weighted velocity scores, a core machine learning model for the particular use case.

10. The computing platform of claim 1, wherein the memory stores additional computer-readable instructions that, when executed by the at least one processor, cause the computing platform to:

receive, from a data source, a second machine learning model, the second machine learning model comprising DVVs for relevant data silos for particular use cases; and refine, based on the second machine learning model, the first machine learning model.

11. The computing platform of claim 10, wherein refining the first machine learning model based on the second machine learning model comprises integrating the relevant data silos and corresponding DVVs from the second machine learning model into the first machine learning model.

12. The computing platform of claim 10, wherein refining the first machine learning model based on the second machine learning model comprises, based on the DVVs for the relevant data silos corresponding to the second machine learning model, replacing relevant data silos corresponding to the first machine learning model with select relevant data silos corresponding to the second machine learning model.

13. The computing platform of claim 1, wherein the memory stores additional computer-readable instructions that, when executed by the at least one processor, cause the computing platform to:

based on data received from a data source, generate new data silos within the distributed ledger system.

14. The computing platform of claim 1, wherein identifying the efficiency of the relevant data silos comprises identifying one or more of: memory usage, total processor utilization, packet loss, and data upload and download speeds.

15. The computing platform of claim 1, wherein updating the DVVs comprises:
generating additional DVVs, wherein each additional DVV indicates a rate of change of data corresponding to a particular variable.

16. The computing platform of claim 1, wherein the computing platform is configured to:
track changes over time in the DVVs for relevant data silos; and
assign, based on the changes over time in the DVVs, a growth score for each of the relevant data silos, wherein the growth score indicates a rate of increase in the DVV over time.

17. The computing platform of claim 16, wherein the computing platform is further configured to:
send, to the distributed ledger system, the growth scores and one or more commands directing the distributed ledger system to modify a stored distributed ledger to include the growth scores, wherein sending the one or more commands directing the distributed ledger system to modify the stored distributed ledger to include the growth scores causes the distributed ledger system to modify the stored distributed ledger to include the growth scores; and
input the growth scores into the first machine learning model to refine the first machine learning model.

18. The computing platform of claim 17, wherein the relevant data silos are comprised of: subsets of data, the subsets of data comprising both constant values and variable values.

19. A method comprising:
at a computing device comprising at least one processor, a communication interface, and memory:
generating data silos within a distributed ledger system, the data silos corresponding to individual data use cases;
receiving, from a first client device corresponding to a first user, a first data use case request;
identifying, based on the first data use case request, relevant data silos corresponding to the first data use case request;
directing the distributed ledger system to grant access, for the first client device, to the relevant data silos;
monitoring the distributed ledger system and the first client device to identify efficiency of the relevant data silos in satisfying the first data use case request;
generating, based on the efficiency of the relevant data silos, a data velocity value (DVV) for each relevant data silo, wherein each DVV indicates a rate of change of data stored in the corresponding relevant data silo;
training, based on the DVVs, a first machine learning model to select, for a particular data use case, a subset of the relevant data silos for the particular data use case, wherein the subset of the relevant data silos for the particular data use case comprises more efficient data for the particular data use case than remaining data of the relevant data silos;
receiving, via a second client device corresponding to a second user, a second data use case request;
identifying, by inputting the second data use case request into the first machine learning model, a subset of relevant data silos for the second data use case request;
monitoring performance of the subset of relevant data silos for the second data use case request;
updating, based on the performance of the subset of relevant data silos, the DVVs;
sending, to the distributed ledger system, the updated DVVs and one or more commands directing the distributed ledger system to modify a stored distributed ledger to include the updated DVVs, wherein sending the one or more commands directing the distributed ledger system to modify the stored distributed ledger to include the updated DVVs causes the distributed ledger system to modify the stored distributed ledger to include the updated DVVs; and
inputting the updated DVVs into the first machine learning model to refine the first machine learning model.

20. One or more non-transitory computer-readable media storing instructions that, when executed by a computing device comprising at least one processor, a communication interface, and memory, cause the computing device to:
generate data silos within a distributed ledger system, the data silos corresponding to individual data use cases;
receive, from a first client device corresponding to a first user, a first data use case request;
identify, based on the first data use case request, relevant data silos corresponding to the first data use case request;
direct the distributed ledger system to grant access, for the first client device, to the relevant data silos;
monitor the distributed ledger system and the first client device to identify efficiency of the relevant data silos in satisfying the first data use case request;
generate, based on the efficiency of the relevant data silos, a data velocity value (DVV) for each relevant data silo, wherein each DVV indicates a rate of change of data stored in the corresponding relevant data silo;
train, based on the DVVs, a first machine learning model to select, for a particular data use case, a subset of the relevant data silos for the particular data use case, wherein the subset of the relevant data silos for the particular data use case comprises more efficient data for the particular data use case than remaining data of the relevant data silos;
receive, via a second client device corresponding to a second user, a second data use case request;
identify, by inputting the second data use case request into the first machine learning model, a subset of relevant data silos for the second data use case request;
monitor performance of the subset of relevant data silos for the second data use case request;
update, based on the performance of the subset of relevant data silos, the DVVs;
send, to the distributed ledger system, the updated DVVs and one or more commands directing the distributed ledger system to modify a stored distributed ledger to include the updated DVVs, wherein sending the one or more commands directing the distributed ledger system to modify the stored distributed ledger to include the updated DVVs causes the distributed ledger system to modify the stored distributed ledger to include the updated DVVs; and input the updated DVVs into the first machine learning model to refine the first machine learning model.

* * * * *